US012367831B2

(12) United States Patent
Gao et al.

(10) Patent No.: US 12,367,831 B2
(45) Date of Patent: Jul. 22, 2025

(54) METHOD FOR DRIVING DISPLAY PANEL AND DISPLAY APPARATUS

(71) Applicant: XIAMEN TIANMA DISPLAY TECHNOLOGY CO., LTD., Xiamen (CN)

(72) Inventors: Yana Gao, Xiamen (CN); Gaojun Huang, Shanghai (CN); Xingyao Zhou, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/762,665

(22) Filed: Jul. 3, 2024

(65) Prior Publication Data

US 2024/0355293 A1 Oct. 24, 2024

(30) Foreign Application Priority Data

Oct. 31, 2023 (CN) ......................... 202311432610.4

(51) Int. Cl.
*G09G 3/3233* (2016.01)

(52) U.S. Cl.
CPC ... *G09G 3/3233* (2013.01); *G09G 2300/0819* (2013.01); *G09G 2300/0861* (2013.01);
(Continued)

(58) Field of Classification Search
CPC .. G09G 3/3233; G09G 3/3266; G09G 3/3258; G09G 3/32; G09G 3/3291; G09G 3/3225; G09G 3/30; G09G 3/3275; G09G 3/20; G09G 3/3208; G09G 2300/0842; G09G 2300/0819; G09G 2300/0861; G09G 2300/0426; G09G 2300/0866; G09G 2300/0852; G09G 2320/0233; G09G 2320/043; G09G 2320/045; G09G 2320/0247; G09G 2310/08; G09G 2310/0251; G09G 2310/0262; G09G 2310/027; G09G 2310/0256; G09G 2330/021
See application file for complete search history.

(56) References Cited

U.S. PATENT DOCUMENTS 12,112,693 B1 * 10/2024 Sang ........................ G09G 3/32
2021/0027696 A1 * 1/2021 Kim ..................... G09G 3/3233
(Continued)

*Primary Examiner* — Dong Hui Liang
(74) *Attorney, Agent, or Firm* — KILPATRICK TOWNSEND & STOCKTON LLP

(57) ABSTRACT

A method for driving a display panel and a display apparatus. In the display panel, each pixel circuit includes an emitting control circuit, a drive transistor, and a first switch circuit, and each display frame includes a first bias adjustment stage. The method includes: controlling, in the first bias adjustment stage, the first switch circuit to transmit the first voltage signal to the terminal of the drive transistor. A duty ratio of an effective level of an emitting control signal in a first display frame of the display panel is different from the duty ratio of the effective level of the emitting control signal in a second display frame of the display panel. The first voltage signal in the first bias adjustment stage of the first display frame is not equal to the first voltage signal in the first bias adjustment stage of the second display frame.

16 Claims, 10 Drawing Sheets

00

(52) U.S. Cl.
CPC . *G09G 2310/08* (2013.01); *G09G 2320/0233* (2013.01); *G09G 2320/0247* (2013.01); *G09G 2340/0435* (2013.01)

(56) References Cited

U.S. PATENT DOCUMENTS

| | | | | |
|---|---|---|---|---|
| 2021/0049958 | A1 | 2/2021 | Kim et al. | |
| 2021/0327352 | A1 | 10/2021 | Zhang et al. | |
| 2023/0335045 | A1* | 10/2023 | Hu | G09G 3/32 |
| 2023/0401997 | A1* | 12/2023 | Jeon | G09G 3/32 |
| 2024/0105119 | A1 | 3/2024 | Liu et al. | |
| 2024/0144881 | A1* | 5/2024 | Park | G09G 3/3233 |
| 2025/0014518 | A1* | 1/2025 | Kong | G09G 3/32 |

* cited by examiner

Data-writing phase of first display frame XT1

Data-writing phase of second display frame XT2

METHOD FOR DRIVING DISPLAY PANEL AND DISPLAY APPARATUS

The present disclosure claims the priority to Chinese Patent Application No. 202311432610.4, titled "METHOD FOR DRIVING DISPLAY PANEL AND DISPLAY APPARATUS", filed on Oct. 31, 2023 with the China National Intellectual Property Administration, the content of which is incorporated herein by reference.

FIELD

The present disclosure relates to the field of display, and in particular to a method for driving a display panel and a display apparatus.

BACKGROUND

Organic light-emitting diode (OLED) display panel are advantageous in thin thickness, lightweight, a wide viewing angle, active light-emitting capability, color adjustable in a continuous range, fast response, low power consumption, low drive voltage, high light-emitting efficiency, and flexibility. Hence, they are regarded as a promising new generation of display technology.

Various techniques for adjusting screen brightness have emerged with development of display technology. For example, pulse width modulation (PWM) is capable to adjust the screen brightness through changing a duty ratio of an electric signal, direct current (DC) dimming is capable to adjust the screen brightness through changing a voltage, and the like. In the PWM mode, the screen is controlled to "flash" at a certain frequency under constant power, while human eyes still perceive continuous display due to persistence of vision. That is, in the PWM dimming mode, sub-pixels alter continuously switched between on and off, and the screen brightness can be changed through adjusting light-emitting duration in the alternation.

At present, demands of users on display quality of the display screens are increasing. A conventional display panel may provide various display modes in which the display panel is refreshed with different. For example, the refresh frequency of a mode for displaying static pictures is low, e.g., 1 Hz, and the refresh frequency of a game mode or a video mode is high, e.g., 120 Hz. The user can easily perceive a change in brightness within one display frame, especially when a screen is driven under the low frequency. That is, the user is aware of flashes and non-uniform brightness in the screen. Even the PWM mode is subject to such strobing phenomenon. In one embodiment, an OLED is capable to be driven by a current. Hence, in the display field, a drive transistor in a pixel circuit is controlled to provide a drive current to the OLED, and the OLED can emit light. Although the OLED requires a stable drive current to ensure display performances in actual applications, the driver transistor in the pixel circuit is subject to a drift in its threshold voltage after long-term operation, which affects a display effect.

Therefore, it is an urgent problem on how to provide a method for driving a display panel and a display apparatus, which are capable to address the issue of the drifted threshold voltage, improve the display effect, improve uniformity and stability of the display brightness under different scanning modes, and avoid screen flashes.

SUMMARY

In view of the above, a method for driving a display panel and a display apparatus are provided according to embodiments of the present disclosure. An issue of screen flashes of conventional display apparatuses, which affects visual experience of users, is addressed.

In one embodiment, a method for driving a display panel is provided according to embodiments of the present disclosure. The display panel includes multiple pixel circuits, each of which includes an emitting control circuit, a drive transistor, a first switch circuit. The emitting control circuit is electrically connected to the drive transistor, and a control terminal of the emitting control circuit is configured to receive an emitting control signal. A control terminal of the first switch circuit is configured to receive a first control signal, a first terminal of the first switch circuit is configured to receive a first voltage signal, and a second terminal of the first switch circuit is electrically connected to a terminal of the drive transistor. Each display frame of the display panel includes a first bias adjustment stage. The method includes: controlling, through the first control signal in the first bias adjustment stage, the first switch circuit to transmit the first voltage signal to the terminal of the drive transistor. A duty ratio of an effective level of the emitting control signal in a first display frame of the display panel is different from the duty ratio of the effective level of the emitting control signal in a second display frame of the display panel. The first voltage signal is equal to $V_{DVH1}$ in the first bias adjustment stage of the first display frame and is equal to $V_{DVH2}$ in the first bias adjustment stage of the second display frame, and $V_{DVH1}$ is not equal to $V_{DVH2}$.

In one embodiment, a display apparatus is further provided according to embodiments of the present disclosure. The display apparatus includes a display panel, which is configured to be driven through the foregoing method.

The method for driving the display panel and the display apparatus according to embodiments of the present disclosure are advantageous over the conventional technology at least in following embodiments.

The method provided herein is applicable to an active-matrix display panel that includes multiple sub-pixels, and each sub-pixel includes a light-emitting apparatus and a pixel circuit electrically connected to the light-emitting apparatus. The pixel circuit is configured to generate a drive current for driving the light-emitting apparatus to emit light. The pixel circuit includes at least the emitting control circuit, the drive transistor and the first switch circuit. A control terminal of the first switch circuit is electrically connected to a terminal for providing the first control signal, the first terminal of the first switch circuit is electrically connected a terminal for providing the first voltage signal, and the second terminal of the first switch circuit is electrically connected to the terminal of the drive transistor. The first switch circuit may be configured to adjust a bias state of the drive transistor. The first switch circuit is controlled to write the first voltage signal into the terminal of the drive transistor in an operation stage of the pixel circuit, and the bias state of the drive transistor is adjusted for suppressing a drift of a threshold voltage of the drive transistor. In one embodiment, an influence of threshold drift on display quality can be reduced, and thus display effect is improved. The display frames of the display panel include the first display frame and the second display frame. The duty ratio of the effective level of the emitting control signal may be configured to be different between the first display frame and the second display frame for adjusting brightness of a screen. In such case, the voltage of the first voltage signal in the first bias adjustment state is also configured to be different between the first display frame and the second display frame. Therefore, when driving the display panel, the voltage of the first voltage signal can be adjusted when the adjusted bias state last for different periods in different display frames. In one embodiment, the issue of the drifted threshold voltage is addressed, the display effect is improved, uniformity and stability of the display brightness are also improved under different scanning modes, and screen flashes are avoided.

In practice, a product according to an embodiment of the present disclosure is not necessary to achieve all foregoing effects.

Hereinafter exemplary embodiments of the present disclosure are described with reference to drawings to clarify other embodiments of the present disclosure.

BRIEF DESCRIPTION OF THE DRAWINGS

The drawings are provided in the specification and constitute a part of the specification, to illustrate various embodiments of the present disclosure. The drawings and its description are intended for explaining principles of the present disclosure.

DETAILED DESCRIPTION

Hereinafter various embodiments of the present disclosure are described in detail in conjunction with the drawings. Unless otherwise specified, relative arrangement of components and/or steps, equations, and values, which are set forth in the embodiments, are not intended for limiting the scope of the present disclosure.

Description of the exemplary embodiments is only illustrative rather than restrictive for the present disclosure and application/usage thereof.

Techniques, methods, and apparatuses, which belong to the common knowledge, may not be discussed in detail, and shall be considered as a part of the specification where appropriate.

Herein any specific value illustrated or discussed in any embodiment is illustrative rather than restrictive. A different value may be used in another embodiment.

Various alternations and modifications easily on a basis of the present disclosure without departing from a spirit or a scope of the present disclosure. Therefore, the present disclosure is intended to cover modifications and changes, which fall within a scope of the appended claims (e.g., claimed embodiments) and their equivalents. Embodiments of the present disclosure may be combined with each other when there is no conflict.

Similar reference signs (including numerals and/or symbols) indicate similar objects. Once an object is defined in illustration of one figure, the object may not be further discussed in illustration of subsequent figures.

Figure 1:
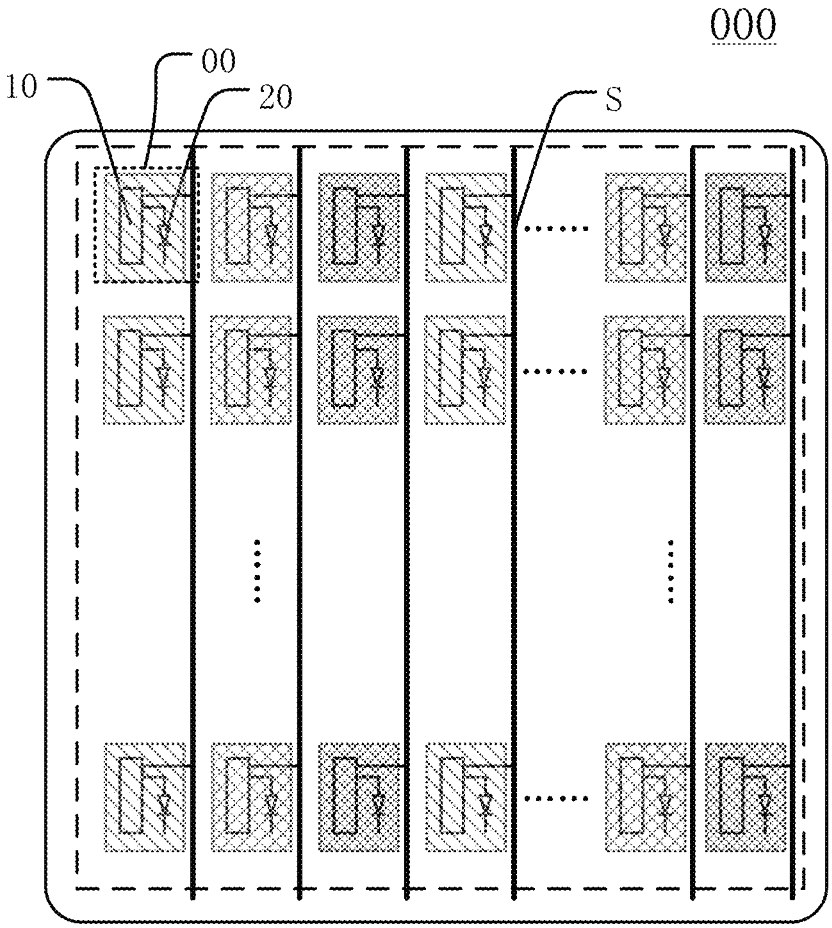
FIG. 1 is a schematic structural diagram of a display panel to which a method for driving a display panel is applied according to an embodiment of the present disclosure.
Figure 2:
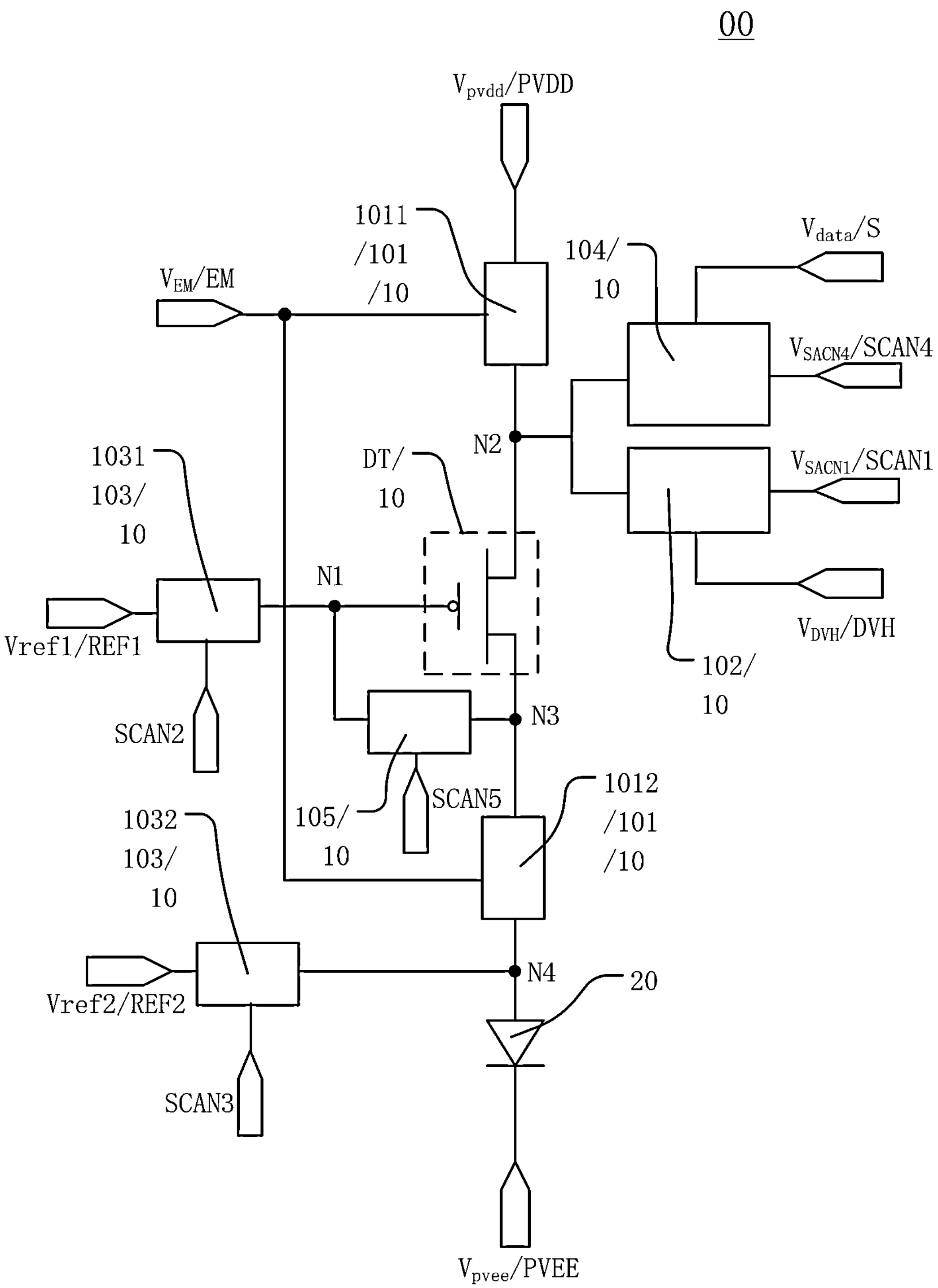
FIG. 2 is a schematic structural diagram of electrical connection in a pixel circuit of a display panel as shown in FIG. 1 according to an embodiment of the present disclosure.

Reference is made to FIG. 1 and FIG. 2 in combination. FIG. 1 is a schematic structural diagram of a display panel to which a method for driving a display panel is applied according to an embodiment of the present disclosure. FIG. 2 is a schematic structural diagram of electrical connection of the pixel circuit as shown in FIG. 1. In an embodiment, a method for driving a display panel is applicable to drive a display panel 000 as shown in FIG. 1 and FIG. 2. The display panel 000 includes multiple pixel circuits 10. Each pixel circuit 10 includes at least an emitting control circuit 101, a drive transistor DT, and a first switch circuit 102.

The emitting control circuit 101 is electrically connected to the drive transistor DT, and a control terminal of the emitting control circuit is electrically connected to a terminal EM for providing an emitting control signal $V_{EM}$.

A control terminal of the first switch circuit 102 is electrically connected to a terminal SCAN1 for providing a first control signal. A first terminal of the first switch circuit 102 is electrically connected to terminal DVH for providing a first voltage signal. A second terminal of the first switch circuit 102 is electrically connected to a terminal of the drive transistor DT.

Each display frame of the display panel includes a first bias adjustment stage J1.

The method includes a following step. The first switch circuit 102 is controlled through the terminal SCAN1 in the first bias adjustment stage to transmit the first voltage signal $V_{DVH}$ to the terminal of the drive transistor DT.

A duty ratio of an effective level of the emitting control signal $V_{EM}$ in a first display frame XT1 of the display panel is different from the duty ratio of the effective level of the emitting control signal $V_{EM}$ in a second display frame XT2 of the display panel.

The first voltage signal is equal to $V_{DVH1}$ in the first bias adjustment stage J1 of the first display frame XT1. The first voltage signal is equal to $V_{DVH2}$ in the first bias adjustment stage of the second display frame XT2. $V_{DVH1}$ is not equal to $V_{DVH2}$ (e.g., in voltage).

The foregoing method is applicable to an active-matrix display panel 000, such as an organic light-emitting diode (OLED) display panel, a micro light-emitting diode (micro-LED) display panel, a quantum-dot light-emitting diode (QLED) display panel, and the like. It is taken as an example in FIG. 1 and FIG. 2 that the display panel 000 is an OLED display panel, in order to illustrate an operation principle of the display panel 000. The display panel 000 may include multiple sub-pixels 00, and each sub-pixel 00 includes a light-emitting apparatus 20 and a pixel circuit 10 which are electrically connected. The pixel circuit 10 is configured to generate a current for driving the light-emitting apparatus 20 to emit light. When the current flows through the light-emitting 20 in the sub-pixel 00, the light-emitting apparatus 20 emits light, and such sub-pixel 00 exhibits a corresponding color in a screen of the display panel. In a case that the current flows through the light-emitting apparatus 20 in each sub-pixel 00, all light-emitting apparatuses 20 in the display panel 000 are turned on, and the display panel 000 reaches maximum brightness under currently applied voltage(s). In a case that the current flows through no light-emitting apparatus 20, all light-emitting apparatuses 20 are turned off, and the display panel 000 is in an off state. Therefore, each sub-pixel 00 may be switched between on and off through operation of the corresponding pixel circuit 10 to implement a display function of the screen.

Herein the pixel circuit 10 electrically connected to the light-emitting apparatus 20 includes at least the emitting control circuit 101, the drive transistor DT, and the first switch circuit 102. Generally, the emitting control circuit 101 and the first switch circuit 102 each includes a thin film transistor, which is configured to drive the light-emitting apparatus 20 to emit light. Details of the thin film transistor are not described herein and may refer to electrical connections of a pixel circuit in the field. Herein the electrical connection of the pixel circuit 10 is only exemplary.

The emitting control circuit 101 is electrically connected to the drive transistor DT, and a control terminal of the emitting control circuit 101 is electrically connected to the terminal EM for providing the emitting control signal $V_{EM}$. Under control of the emitting control signal $V_{EM}$, the emitting control circuit 101 is configured to connect or disconnect a terminal PVDD for providing a first power supply and a first terminal of the drive transistor DT, and/or connect or disconnect a terminal PVEE for providing a second power supply and a second terminal of the drive transistor DT. In an embodiment, the emitting control circuit 101 may include a first emitting control circuit 1011 and a second emitting control circuit 1012. The first emitting control circuit 1011 is electrically connected between the terminal PVDD and the first terminal of the drive transistor DT. The second emitting control circuit 1012 is electrically connected between the terminal PVEE and the second terminal of the drive transistor DT. The light-emitting apparatus 20 is electrically connected between the second emitting control circuit 1012 and the terminal PVEE. Control terminals of both the first emitting control circuit 1011 and the second emitting control circuit 1012 may be connected to the same terminal EM. The emitting control circuit 101 may be turned on at least in a light-emitting stage, to connect the terminal PVDD and the first terminal of the drive transistor DT and connect the terminal PVEE and the second terminal of the drive transistor DT. In one embodiment, the drive current outputted by the drive transistor DT flows through the light-emitting apparatus 20, to drive the light-emitting apparatus 20 to emit light.

In an embodiment, the emitting control signal $V_{EM}$ provided by the terminal EM may be a pulsed signal having alternating high and low levels. The high level may be a signal activating the emitting control circuit 101, i.e., an effective level, while the low level may be a signal deactivating the emitting control circuit 101, i.e., an ineffective level. In one embodiment, the low level may be a signal activating the emitting control circuit 101, i.e., an effective level, while the high level may be a signal deactivating the emitting control circuit 101, i.e., an ineffective level. In a case that the thin film transistor in the emitting control circuit 101 is a p-channel transistor, the control terminal of the emitting control circuit 101 is a gate of the p-channel transistor. In such case, the low level is the signal activating the emitting control circuit 101 (also called the effective level), and the high level is the signal deactivating the emitting control circuit 101 (also called the ineffective level). That is, when the emitting control signal $V_{EM}$ is at the low level, the first terminal and the second terminal of the emitting control circuit 101 are electrically connected. In a case that the thin film transistor in the emitting control circuit 101 is a n-channel transistor, the control terminal of the emitting control circuit 101 is a gate of the n-channel transistor. In such case, the high level is the signal activating the emitting control circuit 101 (also called the effective level), and the low level is the signal deactivating the emitting control circuit 101 (also called the ineffective level). That is, when the emitting control signal $V_{EM}$ is at the high level, the first terminal and the second terminal of the emitting control circuit 101 are electrically connected. Hereinafter the activating signal (the effective level) and the deactivating signal (the ineffective level) applied on a control terminal of another other modules would not be further explained, and reference may be made to the above description concerning how the emitting control circuit 101 is activated or deactivation. Hereinafter it is taken as an example that the thin film transistor in the emitting control circuit 101 is the p-channel transistor, and the control terminal of the emitting control circuit 101 is subject to an activating signal being the low level. That is, the emitting control circuit operates in an "on" state when the emitting control signal $V_{EM}$ from the terminal EM is at the low level. In such example, the drive transistor DT is a p-channel transistor, and the gate of the drive transistor DT is subject to an activating signal being the low level, and the first terminal and the second terminal of the drive transistor DT are electrically connected under the activating signal.

In an embodiment, the pixel circuit 10 of the display panel 000 may further include a reset circuit 103. The reset circuit 103 may include a first reset circuit 1031. A control terminal of the first reset circuit 1031 is electrically connected to a terminal SCAN2 for providing a first reset signal. A first terminal of the first reset circuit 1031 is electrically connected to a terminal REF1 for providing a first reset voltage. A second terminal of the first reset circuit 1031 is electrically connected to the gate of the drive transistor DT (e.g., at a first node N1). The reset circuit 103 may include a second reset circuit 1032. A control terminal of the second reset circuit 1032 is electrically connected to a terminal SCAN 3 for providing a second reset signal. A first terminal of the second reset circuit 1032 is electrically connected to a terminal REF2 for providing a second reset voltage. A second terminal of the second reset circuit 1032 is electrically connected to an anode of the light-emitting apparatus 20 (e.g., at a fourth node N4). The first reset circuit 1031 is configured to provide the first reset voltage Vref1 to the gate of the drive transistor DT when the pixel circuit 10 operates in a reset stage, and a voltage at the gate of the drive transistor DT is reset for initialization. The second reset circuit 1032 is configured to provide the second reset voltage Vref2 to the anode of the light-emitting apparatus 20 when the pixel circuit 10 operates in the reset stage, and a voltage at the anode of the light-emitting apparatus 20 is reset for initialization. A specific principle and process for operation of the reset circuit 103 are not illustrated herein and may refer to operation principles of display panels in the field. A transistor in the first reset circuit 1031 and a transistor in the second reset circuit 1032 may be of an identical type, e.g., both transistors may be p-channel transistors. In one embodiment, the two transistors may be of different types, e.g., the transistor in the first reset circuit 1031, which is connected to a gate of the drive transistor, is an n-channel oxide transistor, while the transistor of the second reset circuit 1032 is a p-channel low-temperature polysilicon transistor. Hereinafter it is taken as an example that the transistor in the first reset circuit 1031 is the n-channel oxide transistor, and the transistor in the second reset circuit 1032 is the p-channel low-temperature polysilicon transistor.

In one embodiment, the transistor in the first reset circuit 1031, which is electrically connected to the gate of the drive transistor DT, is configured to be the n-channel oxide transistor. The n-channel oxide transistor has a low leakage current when being turned off, which can reduce an influence of a leakage current on a potential at the first node N1. Hence, a gate voltage that drives the drive transistor DT is more stable, operation of the drive transistor DT is more stable, and therefore the drive current is more stable. Accordingly, the pixel circuit 10 is capable to ensure stability of brightness of the light-emitting apparatus 20 during operation of the display panel 000. In particular, when the display is driven under a low frequency, duration of one display frame is long, and hence the potential at the first node N1 needs to be stabilized for a long time. In such case, a low-temperature polysilicon transistor electrically connected to the gate of the drive transistor DT would introduce a large off-state leakage current, which has a great influence on the potential at the first node N1, and thus introduce perceivable flashes. In comparison, when serving as the transistor in the first reset circuit 1031, the n-channel oxide transistor electrically connected to the gate of the drive transistor DT has a small off-state leakage current, and the potential at the first node N1 is stable for a long time even when the display is driven under a low frequency. In one embodiment, the flashes are suppressed under the low frequency, and a display effect is improved. Another part of the pixel circuit 10, which is electrically connected to the gate of the drive transistor DT, may also be the n-channel oxide transistor, of which details would not be repeated herein.

In an embodiment, the pixel circuit 10 of the display panel 000 further includes a data-writing circuit 104. A control terminal of the data-writing circuit 104 is electrically connected to a terminal SCAN4 for providing a data control signal. The first terminal of the data-writing circuit 104 is electrically connected to a data line S, which is configured to provide a data signal (also called a data voltage) $V_{data}$. The second terminal of the data-writing circuit 104 is electrically connected to the first terminal of the drive transistor DT. The data-writing circuit 104 is configured to provide the data signal $V_{data}$ to the drive transistor DT in a data-writing stage.

In an embodiment, the pixel circuit 10 of the display panel 000 may further include a threshold compensating circuit 105, which is connected between the gate of the drive transistor DT (i.e., the first node N1) and the second terminal of the drive transistor DT (i.e., the third node N3). A control terminal of the threshold compensating circuit 105 is electrically connected to a terminal SCAN5 for controlling voltage compensation. When the terminal SCAN5 receives an activating signal, a deviation of a threshold voltage of the drive transistor DT can be self-compensated. The threshold compensating circuit 105 can address non-uniform display, which is caused by a deviation in the threshold voltage of the drive transistor DT due to manufacture and a drift in the threshold voltage of the drive transistor DT due to aging. Since the threshold compensating circuit 105 is electrically connected to the gate of the drive transistor DT, a transistor in the threshold compensating circuit 105 may be an n-channel oxide transistor.

A period of the pixel circuit 10 driving the light-emitting apparatus 20 for display includes a light-emitting stage. In such stage, a gate potential of the drive transistor DT (i.e., a potential at the first node N1) is higher than a drain potential of the drive transistor DT (i.e., a potential at the third node N3). Such forward bias of the drive transistor DT results in a hysteresis effect of the drive transistor DT, and a long-term forward bias results in polarization of ions in the drive transistor DT. In one embodiment, a built-in electric field is strengthened in the drive transistor DT, which keeps increasing the threshold voltage of the drive transistor DT. A drift of the threshold voltage further results in unstable display brightness, especially when an image on the screen is switched, and hence there are perceivable screen flashes. That is, the hysteresis effect of drive transistor DT has a great impact on the display effect in practice. Hence, the threshold compensation of the conventional pixel circuits cannot compensate the drifting of the threshold voltage caused by the hysteresis effect.

According to embodiments of the present disclosure, the first switch circuit 102 is arranged in the pixel circuit 10. The control terminal of the first switch circuit 102 is electrically connected to the terminal SCAN1 for providing the first control signal. A first terminal of the first switch circuit 102 is electrically connected to the terminal DVH for providing the first voltage signal. A second terminal of the first switch circuit 102 is electrically connected to a terminal (either a drain or a source) of the drive transistor DT. Herein the second terminal of the first switch circuit 102 may be electrically connected to the first terminal of the drive transistor DT (such as the source of the drive transistor DT). The gate, the source, and the drain of the drive transistor DT are denoted as the first node N1, the second node N2, and the third node N3, respectively. In one embodiment, the second terminal of the first switch circuit 102 may be electrically connected to the second terminal of the drive transistor DT (such as the drain of the drive transistor DT). In FIG. 2, it is taken as an example for illustration that the second terminal of the first switch circuit 102 is electrically connected to the first terminal of the drive transistor DT. The first switch circuit 102 may be regarded as a circuit configured to adjust a bias state.

During operation of the display panel 000, the drive transistor DT in the pixel circuit 10 operates in a forward bias state, to provide the drive current to the light-emitting apparatus 20. In a case that the drive transistor DT has operated in such bias state for a long time, the threshold voltage would drift, which affects the display effect. According to embodiments of the present disclosure, the pixel circuit 10 in the display panel 000 include the first switch circuit 102 connected to the terminal of the drive transistor DT. In an operation stage of the pixel circuit 10, the first switch circuit 102 is controlled to write the first voltage signal $V_{DVH}$, which is provided by the terminal DVH for providing the first voltage signal, to the terminal of the drive transistor DT. In one embodiment, the bias state of the drive transistor DT is changed to reverse the drift of the threshold voltage of the drive transistor DT, and an influence of the drifting on display quality is reduced, which improves the display effect. In an embodiment, there are multiple display frames of the display panel 000 during its operation, and each display frame includes the first bias adjustment stage J1. In the first bias adjustment stage J1, the terminal SCAN1 provides the activating signal to connect the first terminal and the second terminal of the first switch circuit 102 electrically. Under the control of the terminal SCAN1, the first voltage signal $V_{DVH}$ provided by the terminal DVH is transmitted to the terminal of the drive transistor DT, which adjust the bias state of the drive transistor DT to be a reverse bias. That is, the source to the drain of the drive transistor DT is subject to the reverse bias, and a degree of polarization of ions inside the drive transistor DT is weakened, and the threshold voltage of the drive transistor DT is decreased. Thus, the threshold voltage of the drive transistor DT is adjusted through the first switch circuit 102, and the drifting of the threshold voltage due to the hysteresis effect caused by the forward bias state is compensated. The first switch circuit 102 in the display panel 000 can reduce the influence of the hysteresis effect of the drive transistor DT on the display effect to improve the display effect. In an embodiment, the first switch circuit 102 may be independent from the data-writing circuit 104. The first switch circuit 102 operates in the first bias adjustment stage J1, and the first bias adjustment stage J1 is independent from the data-writing stage. The pixel circuit 10 has simple operation logic.

FIG. 2 shows merely an example of the electrical connection of the pixel circuit 10 and between the pixel circuit 10 and the light-emitting apparatus 20. In practice, connection in the sub-pixel 00 includes, but is not limited to, the aforementioned connection and may be implemented in another manner.

Herein one display frame may be divided into a data-writing phase and an emission-holding phase, and corresponding data writing operation has completed in the emission-holding phase. As an example, a refresh frequency of the display panel 000 is as low as 1 Hz. A corresponding refresh period may be uniformly divided into 60 segments, among which the first segment serves duration of the data-writing phase, and remaining 59 segments serve as duration of the emission-holding phase.

The refresh frequency may include a frame-refreshing frequency and a data-refreshing frequency. In case of the frame-refreshing frequency, a frame refers to the smallest cycle of light emission and includes the data-writing phase and the emission-holding phase. In case of the data-refreshing frequency, a data refresh period refers to the smallest cycle of a data-writing signal. The data refresh period may include a data-writing phase and one or more emission-holding phases. Hereinafter it is taken as an example the refresh frequency refers to the data-refreshing frequency.

Figure 3:
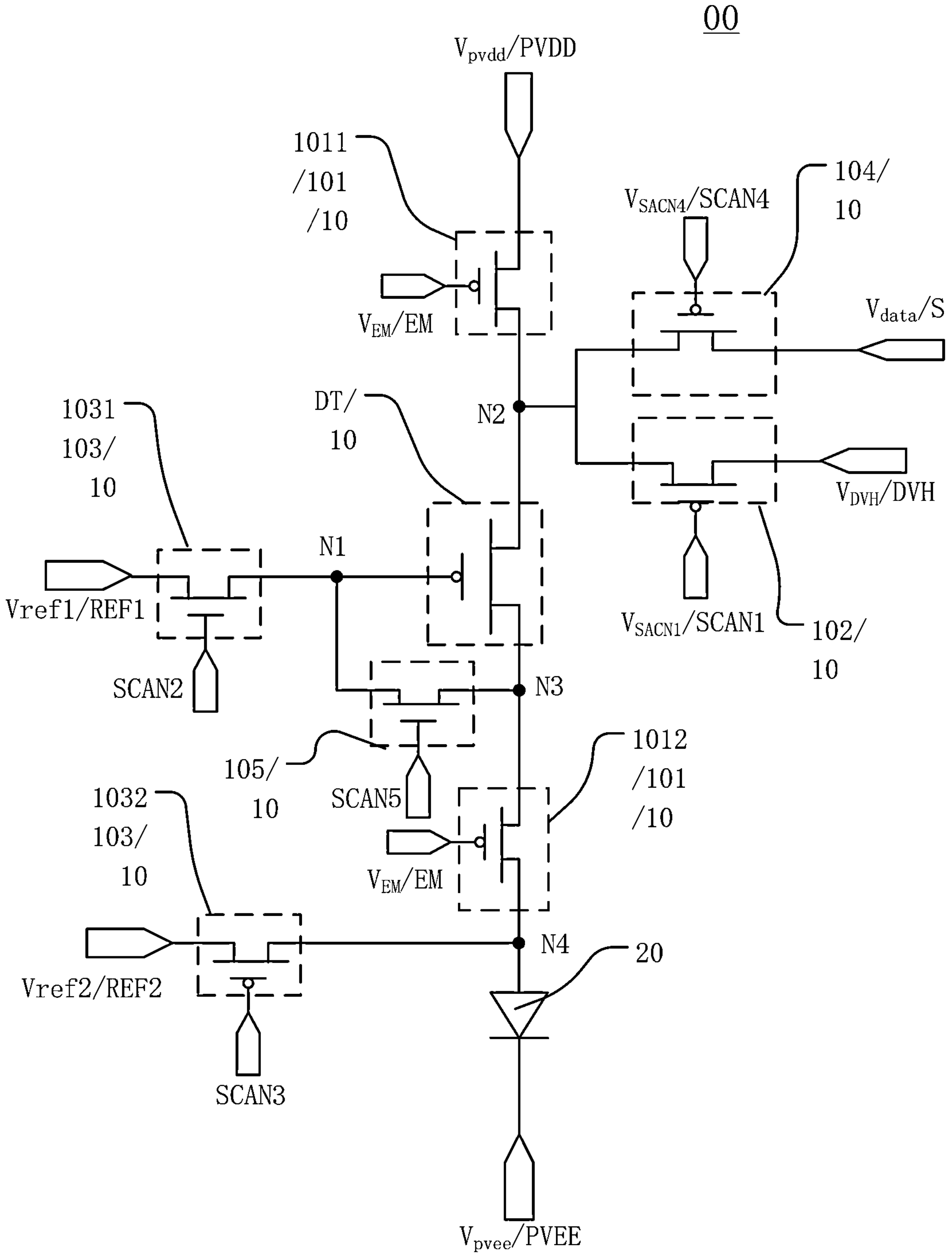
FIG. 3 is a schematic structural diagram of electrical connection between a pixel circuit and a light-emitting apparatus as shown in FIG. 2 according to an embodiment of the present disclosure.
Figure 4:
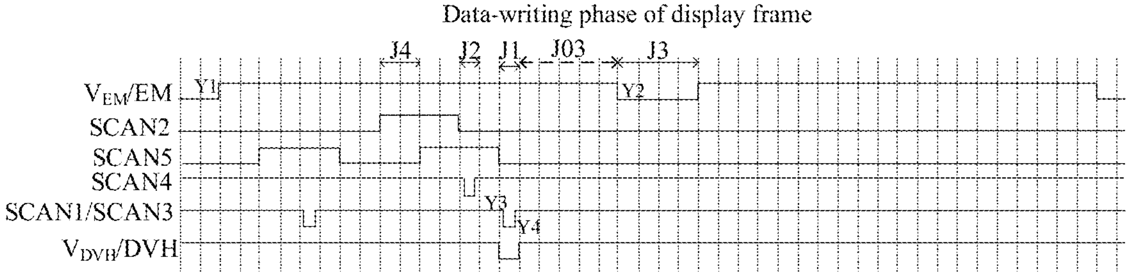
FIG. 4 is a timing diagram of a pixel circuit as shown in FIG. 3 in a data-writing phase of a display frame according to an embodiment of the present disclosure.
Figure 5:
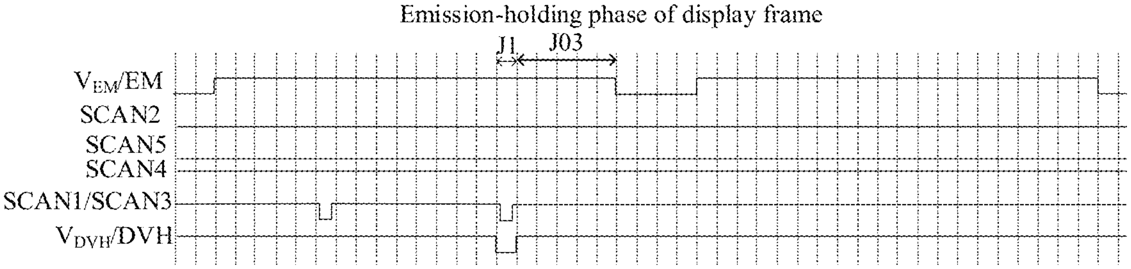
FIG. 5 is a timing diagram of the pixel circuit as shown in FIG. 3 in an emission-holding phase of a display frame according to an embodiment of the present disclosure.

In an embodiment, the pixel circuit 10 in the display panel 000 has the circuit structure as described above. Reference is made to FIG. 3, FIG. 4 and FIG. 5. FIG. 3 is a schematic structural diagram of electrical connection between the pixel circuit and a light-emitting apparatus as shown in FIG. 2. FIG. 4 is a timing diagram of the pixel circuit as shown in FIG. 3 in a data-writing phase of a display frame. FIG. 5 is a timing diagram of the pixel circuit as shown in FIG. 3 in an emission-holding phase of a display frame. Transistors in the first reset circuit 1031 and the threshold compensating circuit 105 are both n-channel oxide transistors, and the remaining transistors in the pixel circuit 10 are p-channel low-temperature polysilicon transistors. As shown in FIG. 4 and FIG. 5, the first bias adjustment stage J1 is subsequent to the data-writing stage J2 during the data-writing phase, and the first bias adjustment stage J1 may further exist in the emission-holding phase. That is, bias adjustment may be performed on the gate of the drive transistor DT in both the data-writing phase and the emission-holding phase of a display frame.

Figure 6:
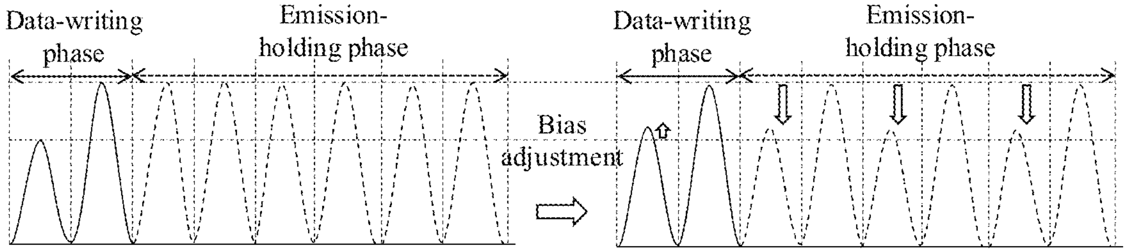
FIG. 6 is a schematic diagram of brightness of a display panel with and without a first bias adjustment stage according to an embodiment of the present disclosure.

Reference is made to FIG. 6, which shows brightness of a display panel with and without the first bias adjustment stage according to an embodiment of the present disclosure. In FIG. 6, the wave-like curves represent variation of the brightness. A case of no bias adjustment of the first switch circuit 102 is shown in left subfigure of FIG. 6. Brightness of the display frames is different between data-writing phase and emission-holding phases. During the data-writing phase, reset operations are performed at the first node N1 and the anode of the light-emitting apparatus 20, and hence the brightness is lower. After entering the emission-holding phase, the brightness would be maintained at a higher level, and the brightness of the display frame is not uniform. Flashes of the screen can be easily perceived at a low driving frequency. A case of the bias adjustment of the first switch circuit 102 is shown in the right subfigure of FIG. 6. The first voltage signal $V_{DVH}$ provided by the terminal DVH may be adjusted during the data-writing phase, or may be adjusted during the emission-holding phase. As shown in the right subfigure, after the first voltage signal $V_{DVH}$ is adjusted during the emission-holding phase, the brightness during the emission-holding phase is reduced. A reason lies in that the first voltage signal $V_{DVH}$ is usually lower than the data signal $V_{data}$, and the drive transistor DT is subject to a reverse bias to decrease the threshold voltage of the drive transistor DT.

In one embodiment, the brightness is reduced, which is depicted in FIG. 6 as a smaller height of pulses in the wave-like curve. The reduced brightness is substantially consistent with the brightness during the data-writing phase, and the brightness in each display frame is substantially uniform, which suppresses the flashes of the screen. Therefore, the display quality can be improved through the bias adjustment of the first switch circuit 102 in the pixel circuit 10.

Generally, the display panel 000 may adopt various techniques for adjusting brightness of the screen. For example, the pulse width modulation may adjust the brightness through altering a duty ratio of an electric signal, that is, the brightness is adjusted based on a duty ratio of the emitting control signal $V_{EM}$ provided by the terminal EM. The duty ratio of the emitting control signal $V_{EM}$ is controlled through a digital signal, which is low in costs and simple in implementation. The pulse width modulation is common in dimming schemes. It is taken as example that a high level of the emitting control signal $V_{EM}$ is a deactivating signal, that is, the high level of the emitting control signal $V_{EM}$ is the ineffective level that disconnects the first terminal and the second terminal of the emitting control circuit 101. In such case, dimming is generally achieved through moving a falling edge of the emitting control signal $V_{EM}$ backward and/or moving a rising edge of the emitting control signal $V_{EM}$ forward.

Reference is made to FIG. 4. After the first bias adjustment stage J1, the falling edge of the emitting control signal $V_{EM}$ is adjusted backward, and the ineffective level of the emitting control signal $V_{EM}$ lasts for a longer time while the effective level of the emitting control signal $V_{EM}$ lasts for a shorter time. In such case, light-emitting duration becomes shorter, and non-emitting duration becomes longer. That is, in such dimming scheme, different brightness corresponds to different lengths of the period between the first bias adjustment stage J1 and the falling edge of the emitting control signal $V_{EM}$ (i.e., the period J03 as shown in FIG. 4, which is a period between a terminating moment of the first bias adjustment stage J1 and a moment of the emitting control signal $V_{EM}$ being switched to the low level for light emission). The falling edge of the emitting control signal $V_{EM}$ varies in time for achieving different brightness, and hence the period J03 is not constant. Such period J03 may be regarded as duration of a period influenced by the bias adjustment. The duration of the period influenced by the bias adjustment is different for different brightness, and hence an effect of bias adjustment is also different. In a case that the periods J03 in different display frames have different lengths, the different effects of bias adjustment would have an impact on the display, for example, results in flashes on the screen.

Figure 7:
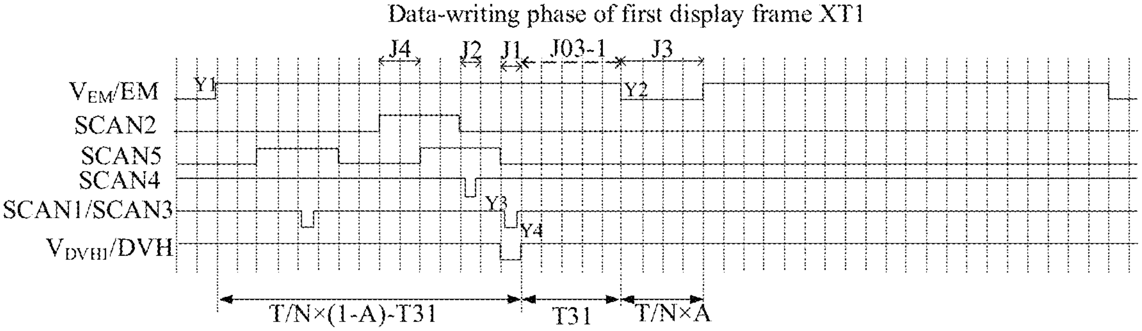
FIG. 7 is a timing diagram of a pixel circuit as shown in FIG. 3 in a data-writing phase of a first display frame according to an embodiment of the present disclosure.
Figure 8:
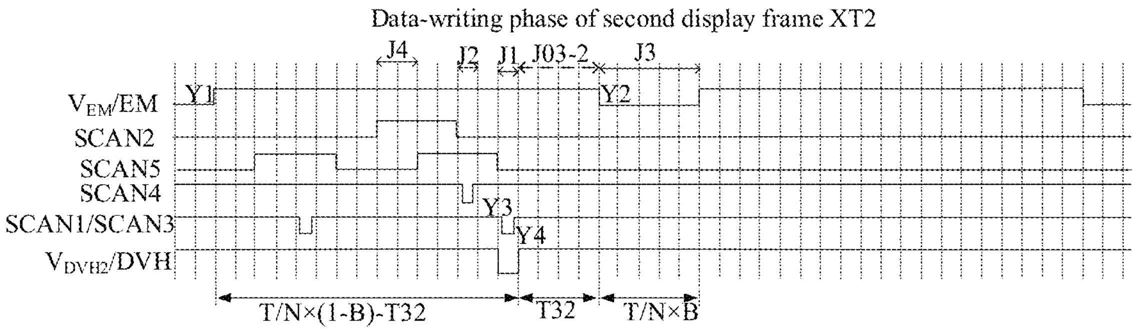
FIG. 8 is a timing diagram of a pixel circuit as shown in FIG. 3 in a data-writing phase of a second display frame according to an embodiment of the present disclosure.

According to embodiments of the present disclosure, the display panel 000 has multiple display frames when operating, and the multiple display frames includes at least a first display frame XT1 and a second display frame XT2. Each of the first display frame XT1 and the second display frame XT2 may include the data-writing phase and the emission-holding phase. A duty ratio of the effective level of the emitting control signal $V_{EM}$ in the first display frame XT1 is different from a duty ratio of the effective level of the emitting control signal $V_{EM}$ in the second display frame XT2. A structure of the pixel circuit as shown in FIG. 1 to FIG. 5 is taken as an example. The duty ratio of the effective level of the emitting control signal $V_{EM}$ may refer to a proportion of duration of the low level in the emitting control signal $V_{EM}$ in a whole pulse cycle (i.e., total duration of one high-level pulse and one low-level pulse that are adjacent) of the emitting control signal $V_{EM}$. The forgoing scheme of moving the falling edge of the emitting control signal $V_{EM}$ backward (hereinafter referred to as backward dimming) is taken as an example of a means of brightness adjustment. The duty ratio of the effective level of the emitting control signal $V_{EM}$ in the first display frame XT1 is different from the duty ratio of the effective level of the emitting control signal $V_{EM}$ in the second display frame XT, which means duration of a period J03-1 between the terminating moment of the first bias adjustment stage J1 and the falling edge of the emitting control signal $V_{EM}$ in the first display frame XT1 is different from duration of a period J03-2 between the terminating moment of the first bias adjustment stage J1 and the falling edge of the emitting control signal $V_{EM}$ in the second display frame XT2. Reference is made to FIG. 7 and FIG. 8. FIG. 7 is a timing diagram of the pixel circuit as shown in FIG. 3 in a data-writing phase of the first display frame. FIG. 8 is a timing diagram of the pixel circuit as shown in FIG. 3 in a data-writing phase of the second display frame. The length of the period J03-1 as shown in FIG. 7 is different from the length of the period J03-2 shown in FIG. 8, which means their duration is different. The first voltage signal in the first bias adjustment stage J1 of the first display frame XT1 is equal to $V_{DVH1}$, the first voltage signal in the first bias adjustment stage J1 of the second display frame XT2 is equal to $V_{DVH2}$, and $V_{DVH1}$ is not equal to $V_{DVH2}$. That is, when the emitting control signal $V_{EM}$ adopts the backward dimming scheme, a voltage of the first voltage signal in the first bias adjustment stage J1 of different display frames is different in a case that the duration of the period between the terminating moment of the first bias adjustment stage J1 and the falling edge of the emitting control signal $V_{EM}$ is different in these display frames.

In a light-emitting stage (when $V_{EM}$ is at the low level) during operation of the pixel circuit 10, the potential at the second node N2 receives the first power supply $V_{pvdd}$ provided by the terminal PVDD, and the potential at the first node N1 is equal to $V_{data}-V_{th}$ (i.e., a voltage difference between the data signal and the threshold compensation signal). Until writing the data signal next time, the bias state of the drive transistor DT is generally determined by the voltage difference between the first power supply $V_{pvdd}$ and the data signal $V_{data}$. As long as the data-signal has been written (i.e., after the data-writing stage J2), the potential at the first node N1 is equal to $V_{data}-V_{th}$, and the second node N2 may receive the first voltage signal $V_{DVH}$ provided by the terminal DVH under control of the terminal SCAN1. At such time, the bias state of the drive transistor DT is determined by the voltage difference between the first voltage signal $V_{DVH}$ and the data signal $V_{data}$.

In the backward dimming scheme, a main difference between the first display frame XT1 and the second display frame XT2 lies in the period J03 between the terminating moment of the first bias adjustment stage J1 and the falling edge of the emitting control signal $V_{EM}$, and an effect of bias adjustment depends mainly on the voltage of the first voltage signal $V_{DVH}$ provided by the terminal DVH. When the emitting control signal $V_{EM}$ is subject to backward dimming throughout different display frames, the duration of the period J03-1 between the terminating moment of the first bias adjustment stage J1 and the falling edge of the emitting control signal $V_{EM}$ in the first display frame XT1 is different from the duration of the period J03-2 between the terminating moment of the first bias adjustment stage J1 and the falling edge of the emitting control signal $V_{EM}$ in the second display frame XT2, which introduce a difference in the effect of bias adjustment. Hence, the first bias adjustment stages J1 in different display frames are configured with different voltages of the first voltage signals according to embodiments of the present disclosure, in order to compensate such issue. For example, the voltage of the first voltage signal in the first bias adjustment stage J1 of the first display frame XT1 is equal to $V_{DVH1}$, the voltage of the first voltage signal in the first bias adjustment stage J1 of the second display frame XT2 is equal to $V_{DVH2}$, and $V_{DVH1}$ is set to be not equal to $V_{DVH2}$. Variation of brightness between different display frames depends on not only duration of a period influenced by the bias adjustment, but also and the voltage of the first voltage signal $V_{DVH}$. When the duration of the period influenced by the bias adjustment is different among different display frames, the voltage of the first voltage signal $V_{DVH}$ is also adjusted. In one embodiment, through the first switch circuit 102, the issue of the drifted threshold voltage is addressed, the display effect is improved, uniformity and stability of the display brightness are improved among different display frames, and screen flashes are avoided. Better display quality is achieved.

Herein the duty ratio of the effective level of the emitting control signal $V_{EM}$ in the first display frame XT1 is different from the duty ratio of the effective level of the emitting control signal $V_{EM}$ in the second display frame XT2. That is, the duration of the period J03-1 between the terminating moment of the first bias adjustment stage J1 and the falling edge of the emitting control signal $V_{EM}$ in the first display frame XT1 is different from the duration of the period J03-2 between the terminating moment of the first bias adjustment stage J1 and the falling edge of the emitting control signal $V_{EM}$ in the second display frame XT2. In such case, the voltage $V_{DVH1}$ of the first voltage signal in the first bias adjustment stage J1 of the first display frame XT1 is configured to be different from the voltage $V_{DVH2}$ of the first voltage signal in the first bias adjustment stage J1 of the second display frame XT2. A value of the voltage $V_{DVH1}$ of the first voltage signal for the first display frame XT1, a value of the voltage $V_{DVH2}$ of the first voltage signal for the second display frame XT2, and a difference between the two values may be set according to the period J03 between the terminating moment of the first bias adjustment stage J1 and the falling edge of the emitting control signals $V_{EM}$ in the corresponding display frames. Details may refer to following embodiments and are not illustrated here.

In the foregoing embodiment(s), brightness of the screen is adjusted through the backward dimming scheme of the emitting control signal $V_{EM}$, where the duration of the period J03 between the terminating moment of the first bias adjustment stage J1 and the falling edge of the emitting control signal $V_{EM}$ is different between display frames. In practice, the brightness adjustment is not limited to the backward dimming scheme and may include a forward dimming scheme of the emitting control signal $V_{EM}$. Details of the forward dimming scheme may refer to following embodiments and are not illustrated here.

Reference is made to FIGS. 1 to 5, FIG. 7 and FIG. 8. In an embodiment, the display panel further includes the data-writing circuit 104. The control terminal of the data-writing circuit 104 is electrically connected to the terminal SCAN4 for providing the data control signal, the first terminal of the data-writing circuit 104 is electrically connected to the data line S, and the second terminal of the data-writing circuit 104 is electrically connected to the first terminal of the drive transistor DT (e.g., connected to the second node N2).

Each display frame includes the data-writing phase and the emission-holding phase (as shown in FIG. 4 and FIG. 5).

Reference is made to FIG. 4. It is taken as an example that the deactivating signal (i.e., the ineffective level) in the emitting control signal $V_{EM}$ is the high level. In an embodiment, the emitting control signal $V_{EM}$ is at the ineffective level during the data-writing stage of the display frame, and the pulse of the ineffective level has a first edge Y1 and a second edge Y2 subsequent to the first edge Y1. Since the deactivating signal in the emitting control signal $V_{EM}$ is the high level, the first edge Y1 is a rising edge and the second edge Y2 is a falling edge Y2.

The data-writing phase of the display frame includes a data-writing stage J2 and a first bias adjustment stage J1. The first bias adjustment stage J1 is subsequent to the data-writing stage J2, that is, the bias state is adjusted after the data signal $V_{data}$ is written.

In the data-writing stage J2, the first terminal and the second terminal of the data-writing circuit 104 is electrically connected under control of the data control signal $V_{SCAN4}$ provided by the terminal SCAN4, and the data signal $V_{data}$ provided by the data line S is transmitted to the first terminal of the drive transistor DT (e.g., to the second node N2).

In the first bias adjustment stage J1, the first control signal $V_{SCAN1}$ provided by the terminal SCAN1 is at the effective level which connects the first terminal and the second terminal of the first switch circuit 102 electrically (where it is taken as an example that the activating signal of the first control signal $V_{SCAN1}$ is the low level). In such case, a pulse of the effective level of the first control signal $V_{SCAN1}$ has a third edge Y3 and a fourth edge Y4 subsequent to the third edge Y3. Since the effective level of the first control signal $V_{SCAN1}$ is the low level, the third edge Y3 is a falling edge and the fourth edge Y4 is the rising edge.

The fourth edge Y4 is precedent to the second edge Y2, that is, the first bias adjustment stage J1 terminates before a light-emitting stage J3 starts. After the data-writing stage J2, there is the first bias adjustment stage J1 and then the light-emitting stage J3. In the light-emitting stage J3, the first terminal of the emitting control circuit 101 is electrically connected to the terminal PVDD for providing the first power supply, that is, the first power supply $V_{pvdd}$ provided by the terminal PVDD is transmitted to the first terminal of the drive transistor DT (i.e., to the second node N2) under control of the emitting control signal $V_{EM}$. Meanwhile, the second power supply $V_{pvee}$ provided by the terminal PVEE is transmitted to the cathode of the light-emitting apparatus 20 under control the emitting control signal $V_{EM}$.

In an embodiment, an operation cycle of the pixel circuit 10 include at least a reset stage J4, the data-writing stage J2, the first bias adjustment stage J1 and the light-emitting stage J3.

In the reset stage J4, the terminal SCAN2 for providing the first reset signal provides the high level as the activating signal, to activate the first reset circuit 1031 and apply the first reset voltage Vref1 to the gate of the drive transistor DT. In one embodiment, the gate of the drive transistor DT is reset for initialization. The terminal SCAN3 for providing the second reset signal may utilize the low level as the activating signal, to connect the first terminal and the second terminal of the second reset circuit 1032 electrically and apply the second reset voltage Vref2 to the anode of the light-emitting apparatus 20 (e.g., to the fourth node N4). In one embodiment, the anode of the light-emitting apparatus 20 is reset for initialization. Hence, residual of the data signal in the last frame can be eliminated, which suppresses trace phenomenon and improve the display effect of the display panel 000.

The control terminal of the data-writing circuit 104 is electrically connected to the terminal SCAN4, the first terminal of the data-writing circuit 104 is electrically connected to the data line S providing the data signal $V_{data}$, and the second terminal of the data-writing circuit 104 is electrically connected to the first terminal of the drive transistor DT. In the data-writing stage J2, the data-writing circuit 104 provides the data signal $V_{data}$ for the drive transistor DT, and the data signal $V_{data}$ is written to the gate of the drive transistor DT via the data-writing circuit 104. The control terminal of the threshold compensating circuit 105 is electrically connected to the terminal SCAN5 for providing the compensation control signal. In the data-writing stage J2, the threshold compensating circuit 105 self-compensates a deviation of the threshold voltage of the drive transistor DT when the terminal SCAN5 provides a high level as the activating signal.

The control terminal of the first switch circuit 102 is electrically connected to the terminal SCAN1 for providing the first control signal. In the first bias adjustment stage J1, the terminal SCAN1 provides a low level as the activating signal, to connect the first terminal and the second terminal of the first switch circuit 102 electrically and transmit the first voltage signal $V_{DVH}$ provided by the terminal DVH to the terminal of the drive transistor DT. The bias state of drive transistor DT is adjusted to be the reverse bias. In one embodiment, the threshold voltage of the drive transistor DT is recovered to achieve a better display effect.

The control terminal of the emitting control circuit 101 is electrically connected to the terminal EM for providing the emitting control signal. In the light-emitting stage J3, the terminal EM provides a low level as the activating signal in the emitting control signal $V_{EM}$. In one embodiment, the first terminal and the second terminal of the emitting control circuit 101 are electrically connected, terminal PVDD for providing the first power supply is connected to the first terminal of the drive transistor DT, and the terminal PVEE for providing the second power supply is connected to the second terminal of the drive transistor DT. The drive current outputted by the drive transistor DT flows through the light-emitting apparatus 20 to drive light emission of the light-emitting apparatus 20.

Herein the brightness of the display panel 000 is adjusted through a duty ratio of the emitting control signal $V_{EM}$ provided by the terminal EM. The duty ratio of the emitting control signal $V_{EM}$ is controlled through a digital signal, which is low in costs and simple in implementation. The pulse width modulation is commonly utilized in dimming schemes. It is taken as example that a high level of the emitting control signal $V_{EM}$ is a deactivating signal, that is, the high level of the emitting control signal $V_{EM}$ is the ineffective level that disconnects the first terminal and the second terminal of the emitting control circuit 101. In such case, dimming is generally achieved through moving a falling edge of the emitting control signal $V_{EM}$ backward and/or moving a rising edge of the emitting control signal $V_{EM}$ forward.

Reference is made to FIG. 7 and FIG. 8. After the first bias adjustment stage J1 and before the light-emitting stage J3, the falling edge of the emitting control signal $V_{EM}$ is moved backward. In one embodiment, the duration of the deactivating signal in the emitting control signal $V_{EM}$ becomes longer, the duration of the activating signal in the emitting control signal $V_{EM}$ becomes shorter. In such case, a light-emitting period becomes shorter, and the non-emitting period becomes longer. That is, in such dimming scheme, different brightness corresponds to different lengths of the period between the first bias adjustment stage J1 and the falling edge of the emitting control signal $V_{EM}$. As shown in FIG. 7 and FIG. 8, a length of a period between the second edge Y2 and the fourth edge Y4 is equal to T31 in the first display frame XT1, a length of a period between the second edge Y2 and the fourth edge Y4 is equal to T32 in the second display frame XT2, and T31 is not equal to T32. In FIG. 7 and FIG. 8, it is taken as an example that T31 is greater than T32. In one embodiment, the duty ratio of the effective level of the emitting control signal $V_{EM}$ in the first display frame XT1 is different from the duty ratio of the effective level of the emitting control signal $V_{EM}$ in the second display frame XT2. The brightness of the screen can be adjusted accordingly.

Herein the length T31 of the period between the second edge Y2 and the fourth edge Y4 in the first display frame XT1 is different from the length T32 of the period between the second edge Y2 and the fourth edge Y4 in the second display frame XT2. That is, the duration of a period influenced by the bias adjustment is different, and thus the effect of bias adjustment is different. Different effects of bias adjustment in different display frames would influence display, for example, introduce flashes on the screen. According to embodiments of the present disclosure, the voltage of the first voltage signal $V_{DVH}$ provided by the terminal DVH in the first bias adjustment stage J1 are adjusted among different display frames.

In an embodiment, the data signal $V_{data}$, the first voltage signal $V_{DVH}$, and the length of the period between the two corresponding edges Y2 and Y4 follow the flowing equation for the first display frame XT1 and the second display frame XT2.

$$T31\times(V_{DVH1}-V_{data})^2=T32\times(V_{DVH2}-V_{data})^2$$

In the first bias regulation stage J1, the first terminal and the second terminal of the first switch circuit 102 are electrically connected under control of the low level, i.e., the activating signal in the first control signal provided by the terminal SCAN1. The first voltage signal $V_{DVH}$ is written to the second node N2. In the period J03 between the first bias adjustment stage J1 and the light-emitting stage J3, the potential at the second node N2 may be regarded as equal to a voltage of the first voltage signal $V_{DVH}$, or relevant to the voltage of the first voltage signal $V_{DVH}$ (since there is some leakage due to a lack of potential maintenance). When entering the light-emitting stage J3, the emitting control signal $V_{EM}$ is converted from the high level, i.e., the ineffective level, to the low level, i.e., the effective level, and the potential at the second node N2 changes. In each display frame, the effect of the bias adjustment depend on not only a potential difference between the second node N2 and the first node N1, but also duration of a period between the first bias adjustment stage J1 and the light-emitting stage J3, i.e., the duration of period J03. The longer the duration of period J03 is, the stronger the effect of bias adjustment is. The lower the voltage of the first voltage signal $V_{DVH}$ is, the stronger the effect of bias adjustment. When the falling edge of the emitting control signal $V_{EM}$ is move backward, the duration of period J03 becomes longer, which strengthens the effect of bias adjustment. Assuming that the brightness has been adjusted to a desired degree at a certain moment, moving the falling edge of the emitting control signal $V_{EM}$ further backward would further strengthens the effect of bias adjustment, resulting in undesirable brightness (e.g., brighter than what is expected) after switching to a next phase. In one embodiment, the uniform and stable brightness as expected cannot be achieved, and there may be flashes in the screen within one frame or across sequential frames. Such issue would be more apparent under low-frequency driving.

When the duty ratio of the emitting control signal $V_{EM}$ is adjusted, the final brightness of the light-emitting apparatus 20 is generally determined by the duration of the period influenced by the bias adjustment, i.e., by the duration of the period J03 between the first bias adjustment stage J1 and the light-emitting stage J3. Hence, the effect of bias adjustment in the period J03 depends on the voltage of the first voltage signal $V_{DVH}$ and the duration of the period J03. In a case that the duration of the period J03 is long, a higher voltage (smaller in absolute value since it is negative) of the first voltage signal $V_{DVH}$ is required. In a case that the duration of the period J03 is short, a lower voltage (greater in absolute value since it is negative) of the first voltage signal $V_{DVH}$ is required. In one embodiment, the data signal $V_{data}$, the first voltage signal $V_{DVH1}$, the length T31 of the period between the second edge Y2 and the fourth edge Y4 for the first display frame XT1, and the data signal $V_{data}$, the first voltage signal $V_{DVH2}$, and the length T32 of the period between the second edge Y2 and the fourth edge Y4 for the second display frame XT2, may follow the equation $T31\times(V_{DVH1}-V_{data})^2=T32\times(V_{DVH2}-V_{data})^2$. In such case, the voltage of the data signal $V_{data}$ provided by data line S may be equal between the first display frame XT1 and the second display frame XT2. In practice, when the length T31 of the period between the second edge Y2 and the fourth edge Y4 in the first display frame XT1 is different from the length T32 of the period between the second edge Y2 and the fourth edge Y4 in the second display frame XT2, the voltage of the first voltage signal $V_{DVH2}$ in the first bias adjustment stage J1 of the second display frame XT2 can be calculated through the foregoing equation according to the voltage of the first voltage signal $V_{DVH1}$ in the first bias adjustment stage J1 of the first display frame XT1. Similarly, the voltage of the first voltage signal $V_{DVH}$ provided by the terminal DVH can be adjusted for another display frame. As shown in FIG. 7 and FIG. 8, the length T31 of the period between the second edge Y2 and the fourth edge Y4 in the first display frame XT1 is greater than the length T32 of the period between the second edge Y2 and the fourth edge Y4 in the second display frame XT2, and hence the voltage of the first voltage signal $V_{DVH1}$ in the first bias adjustment stage J1 of the first display frame XT1 is configured to be higher (e.g., smaller in absolute value) than the voltage of the first voltage signal $V_{DVH2}$ in the first bias adjustment stage J1 of the second display frame XT2. For example, the left part and the right part of the above equation are adjusted to be equal. In one embodiment, screen flashes due to variations in the effect of bias adjustment effect, which are caused by a change in duration of the period influenced by the bias adjustment, among different frames are avoided, and the display quality is improved.

Hereinafter the length T31 of the period between the second edge Y2 and the fourth edge Y4 in the first display frame XT1, and the length T32 of the period between the second edge Y2 and the fourth edge Y4 in the second display frame XT2, are further illustrated in an embodiment.

When the emitting control signal $V_{EM}$ is at the ineffective level (i.e., the high level in this example), the emitting control circuit 101 is deactivated.

Duration of the ineffective level in emitting control signal $V_{EM}$ is equal to T/N×(1−A) in the first display frame XT1, and is equal to T/N×(1−B) in the second display frame XT2. T represents duration of displaying a whole frame, that is, time required to display a complete image on the screen through scanning all pixel lines in the display panel 000. N represents a quantity of pulses of the ineffective level in the emitting control signal $V_{EM}$ within one display frame. In a case that the quantity of the pulses of the ineffective level is identical to a quantity of pulses of the effective level in the emitting control signal $V_{EM}$ within one frame, one pulse of the effective level and one pulse of the ineffective level that are adjacent may be called a pulse group. In such case, N represents a quantity of pulse groups in one display frame, and T/N represents duration of one period of the emitting control signal. The duty ratio A of the effective level of the emitting control signal $V_{EM}$ in the first display frame XT1 is different from the duty ratio B of the effective level of the emitting control signal $V_{EM}$ in the second display frame XT2. The duration of the light-emitting stage in the first display frame XT1 is equal to T/N×A, and the duration of the light-emitting stage in the second display frame XT2 is equal to T/N×B. Accordingly, the duration of the light-emitting stage in the first display frame XT1 and the duration of the light-emitting stage in the second display frame XT2 are also different, which leads to different brightness in the two display frames. The duration of the ineffective level of the emitting control signal $V_{EM}$ in the first display frame XT1 is equal to T/N×(1−A), and hence duration of the non-emitting stage other than the period influenced by the bias adjustment in the first display frame XT1 is equal to T/N×(1−A)−T31. The duration of the ineffective level of the emitting control signal $V_{EM}$ in the second display frame XT2 is equal to T/N×(1−B), and hence duration of the non-emitting stage other than the period influenced by the bias adjustment in the second display frame XT2 is equal to T/N×(1−B)−T32. In an embodiment, T/N×(1−A)−T31 and T/N×(1−B)−T32 may be configured to be identical. In such case, although the period influenced by the bias adjustment is different, the remaining duration is identical between the first display frame XT1 and the second display frame XT2, which prevents duration of another stage introduces a difference in the effect of bias adjustment. In one embodiment, only the voltage of the first voltage signal $V_{DVH}$ is required to be adjusted when addressing the issue of non-uniform brightness in the backward dimming scheme. That is, a scheme of improving the display quality is simplified as much as possible.

Figure 9:
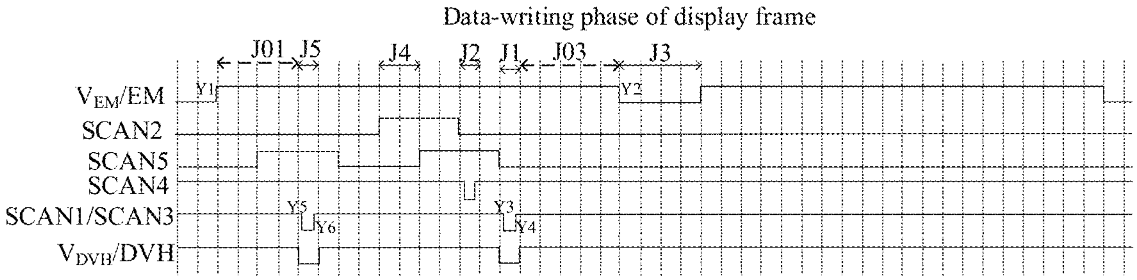
FIG. 9 is a timing diagram of a pixel circuit as shown in FIG. 3 in a data-writing phase of a display frame according to another embodiment of the present disclosure.
Figure 10:
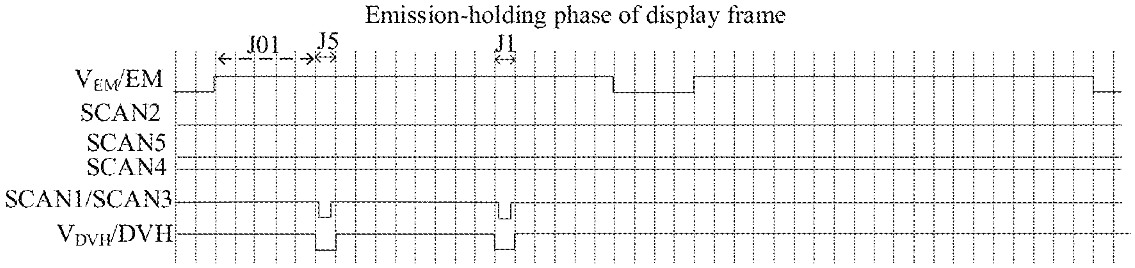
FIG. 10 is a timing diagram of a pixel circuit as shown in FIG. 3 in an emission-holding phase of a display frame according to another embodiment of the present disclosure
Figure 11:
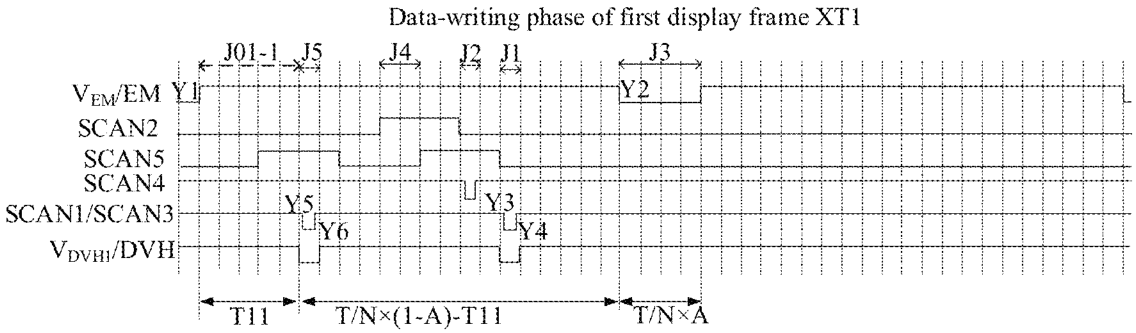
FIG. 11 is a timing diagram of a pixel circuit as shown in FIG. 3 in a data-writing phase of a first display frame according to another embodiment of the present disclosure.
Figure 12:
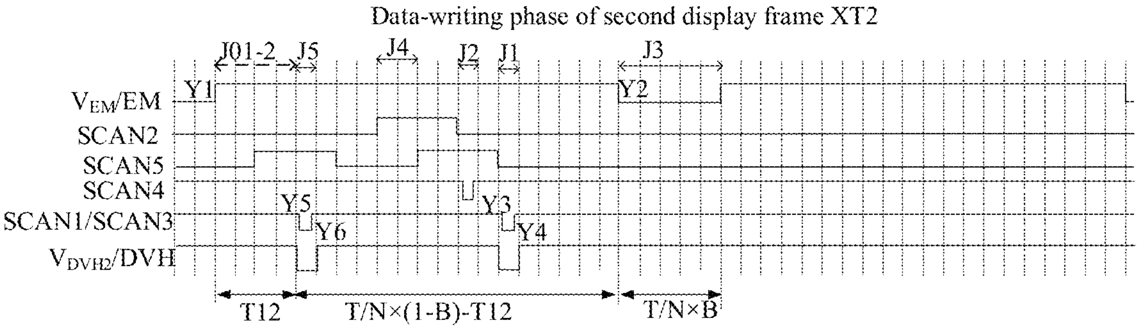
FIG. 12 is a timing diagram of a pixel circuit as shown in FIG. 3 in a data-writing phase of a second display frame according to another embodiment of the present disclosure.

Reference is made to FIGS. 1 to 3 and 9 to 12. FIG. 9 is a timing diagram of the pixel circuit as shown in FIG. 3 in a data-writing phase of a display frame. FIG. 10 is a timing diagram of the pixel circuit as shown in FIG. 3 in an emission-holding phase of a display frame. FIG. 11 is a timing diagram of the pixel circuit as shown in FIG. 3 in a data-writing phase of a first display frame. FIG. 12 is a timing diagram of the pixel circuit as shown in FIG. 3 in a data-writing phase of second display frame. In an embodiment, the display panel 000 further includes the reset circuit 103. The reset circuit may include a first reset circuit 1031. The control terminal of the first reset circuit 1031 is electrically connected to the terminal SCAN2 for providing the first reset signal. The first terminal of the first reset circuit 1031 is electrically connected to the terminal REF1 for providing the first reset voltage. The second terminal of the first reset circuit 1031 is electrically connected to the gate of the drive transistor DT (e.g., to the first node N1). The reset circuit 103 may include a second reset circuit 1032. A control terminal of the second reset circuit 1032 is electrically connected to the terminal SCAN3 for providing the second reset signal, the first terminal of the second reset circuit 1032 is electrically connected to the terminal REF2 for providing the second reset voltage. The second terminal of the second reset circuit 1032 is electrically connected to the anode of the light-emitting apparatus 20 (e.g., to the fourth node N4).

The emitting control circuit 101 may include the first emitting control circuit 1011 and the second emitting control circuit 1012. The first emitting control circuit 1011 is electrically connected between the terminal PVDD for providing the first power supply and the first terminal of the drive transistor DT. The second emitting control circuit 1012 is electrically connected between the terminal PVEE for providing the second power supply and the second terminal of the drive transistor DT. The light-emitting apparatus 20 is electrically connected between the second emitting control circuit 1012 and the terminal PVEE for providing the second power supply. The control terminal of the first emitting control circuit 1011 and the control terminal of the second emitting control circuit 1012 may be both connected to the terminal EM. The emitting control circuit 101 may be activated at least during the light-emitting stage. In one embodiment, the terminal PVDD is electrically connected to the first terminal of the drive transistor DT and the first power supply $V_{pvdd}$ provided by the terminal PVDD is transmitted to the first terminal of the drive transistor DT, and the terminal PVEE is electrically connected to the second terminal of the drive transistor DT and the second power supply $V_{pvee}$ provided by the terminal PVEE is transmitted to the cathode of the light-emitting apparatus 20. Hence, the drive current outputted by the drive transistor DT is capable to flow through the light-emitting apparatus 20, to drive light emission of the light-emitting apparatus 20.

Reference is made to FIG. 9. In an embodiment, the display frame further includes a second bias adjustment stage J5 and a reset stage J4. The reset stage J4 is precedent to the data-writing stage J2, and the second bias adjustment stage J5 is precedent to the reset stage J4.

It is taken as an example that a low level of the first control signal $V_{SCAN1}$ is the activating signal that connects the first terminal and the second terminal of the first switch circuit 102 electrically. In the second bias adjustment stage J5, the first control signal $V_{SCAN1}$ provided by the terminal SCAN1 is at the effective level, i.e., the low level. A pulse of the effective level in the first control signal $V_{SCAN1}$ has a fifth edge Y5 and a sixth edge Y6 subsequent to the fifth edge Y5. Since the effective level of the first control signal $V_{SCAN1}$ is the low level, the fifth edge Y5 is a falling edge and the sixth edge Y6 is a rising edge.

The fifth edge Y5 is subsequent to the first edge Y1, and the sixth edge Y6 is precedent to the third edge Y3. That is, the second bias adjustment stage J5 is subsequent to the light-emitting stage in a last display frame and precedent to the reset stage J4 of the current display frame. After the second bias adjustment stage J5, there is the reset stage J4 and then the data-writing stage J2. After the data-writing stage J2, there is the first bias adjustment stage J1 and then the light-emitting stage J3. The first terminal of the emitting control circuit 101 is electrically connected to the terminal PVDD for providing the first power supply. In the light-emitting stage J3, under control of the emitting control signal $V_{EM}$, the first power supply $V_{pvdd}$ provided by the terminal PVDD is transmitted to the first terminal of the drive transistor DT (e.g., to the second node N2), and the second power supply $V_{pvee}$ provided by the terminal PVEE is transmitted to the cathode of the light-emitting apparatus 20.

In one embodiment, the operation cycle of the pixel circuit 10 includes at least the second bias adjustment stage J5, the reset stage J4, the data-writing stage J2, the first bias adjustment stage J1, and the light-emitting stage J3.

The control terminal of the first switch circuit 102 is electrically connected to the terminal SCAN1 for providing the first control signal. In the second bias adjustment stage J5 precedent to the reset stage J4, the terminal SCAN1 provides the low level as the activating signal to connect the first terminal and the second terminal of the first switch circuit 102 electrically. The first voltage signal $V_{DVH}$ provided by the terminal DVH is transmitted to the terminal of the drive transistor DT, and the bias state of the drive transistor DT is adjusted to be the reverse bias. In one embodiment, the threshold voltage of the drive transistor DT is recovered to achieve a better display effect.

In the reset stage J4, the terminal SCAN2 provides the high level as the activating signal to activate the first reset circuit 1031, and the first reset voltage Vref1 is applied to the gate of the drive transistor DT. That is, a potential at the gate of the drive transistor DT is reset for initialization. In one embodiment, the terminal SCAN3 may provide the low level as the activating signal to connect the first terminal and the second terminal of the second reset circuit 1032 electrically, and the second reset voltage Vref2 is applied to the anode of the light-emitting apparatus 20 (e.g., to the fourth node N4). That is, the anode of the light-emitting apparatus 20 is reset for initialization. Hence, residual of the data signal in the last frame can be eliminated, which suppresses trace phenomenon and improve the display effect of the display panel 000.

The control terminal of the data-writing circuit 104 is electrically connected to the terminal SCAN4, the first terminal of the data-writing circuit 104 is electrically connected to the data line S providing the data signal $V_{data}$, and the second terminal of the data-writing circuit 104 is electrically connected to the first terminal of the drive transistor DT. In the data-writing stage J2, the data-writing circuit 104 provides the data signal $V_{data}$ for the drive transistor DT, and the data signal $V_{data}$ is written to the gate of the drive transistor DT via the data-writing circuit 104. The control terminal of the threshold compensating circuit 105 is electrically connected to the terminal SCAN5 for providing the compensation control signal. In the data-writing stage J2, the threshold compensating circuit 105 self-compensates a deviation of the threshold voltage of the drive transistor DT when the terminal SCAN5 provides a high level as the activating signal.

The control terminal of the first switch circuit 102 is electrically connected to the terminal SCAN1 for providing the first control signal. In the first bias adjustment stage J1, the terminal SCAN1 provides a low level as the activating signal, to connect the first terminal and the second terminal of the first switch circuit 102 electrically and transmit the first voltage signal $V_{DVH}$ provided by the terminal DVH to the terminal of the drive transistor DT. The bias state of drive transistor DT is adjusted to be the reverse bias. In one embodiment, the threshold voltage of the drive transistor DT is recovered to achieve a better display effect.

The control terminal of the emitting control circuit 101 is electrically connected to the terminal EM for providing the emitting control signal. In the light-emitting stage J3, the terminal EM provides a low level as the activating signal in the emitting control signal $V_{EM}$. In one embodiment, the first terminal and the second terminal of the emitting control circuit 101 are electrically connected, terminal PVDD for providing the first power supply is connected to the first terminal of the drive transistor DT, and the terminal PVEE for providing the second power supply is connected to the second terminal of the drive transistor DT. The drive current outputted by the drive transistor DT flows through the light-emitting apparatus 20 to drive light emission of the light-emitting apparatus 20.

In one embodiment, two bias adjustment stages are configured in one operation phase of the pixel circuit 10. The two bias adjustment stages are the second bias adjustment stage J5 precedent to the reset stage J4 and the first bias adjustment stage J1 between the data-writing stage J2 and the light-emitting stage J3. Hence, more time are spent on adjusting the bias state of the drive transistor DT during the driving, and the drifting of the threshold voltage of drive transistor DT due to the hysteresis effect can be compensated to a greater degree.

Generally, the display panel 000 may adopt various techniques for adjusting brightness of the screen. For example, the pulse width modulation may adjust the brightness through altering a duty ratio of an electric signal, that is, the brightness is adjusted based on a duty ratio of the emitting control signal $V_{EM}$ provided by the terminal EM. The duty ratio of the emitting control signal $V_{EM}$ is controlled through a digital signal, which is low in costs and simple in implementation. The pulse width modulation is common in dimming schemes. It is taken as example that a high level of the emitting control signal $V_{EM}$ is a deactivating signal, that is, the high level of the emitting control signal $V_{EM}$ is the ineffective level that disconnects the first terminal and the second terminal of the emitting control circuit 101. In such case, dimming is generally achieved through moving a falling edge of the emitting control signal $V_{EM}$ backward and/or moving a rising edge of the emitting control signal $V_{EM}$ forward.

Reference is made to FIG. 9. Before the second bias adjustment stage J5, the rising edge of the emitting control signal $V_{EM}$ is adjusted forward, and the ineffective level of the emitting control signal $V_{EM}$ lasts for a longer time while the effective level of the emitting control signal $V_{EM}$ lasts for a shorter time. In such case, light-emitting duration becomes shorter, and non-emitting duration becomes longer. That is, in such dimming scheme, different brightness corresponds to different lengths of the period between the rising edge of the emitting control signal $V_{EM}$ and the second bias adjustment stage J5 (i.e., the period J01 as shown in FIG. 9, which is a period between a moment of the emitting control signal $V_{EM}$ being switched to the high level for stopping light emission and a starting moment of the second bias adjustment stage J5). The rising edge of the emitting control signal $V_{EM}$ varies in time for achieving different brightness, and hence the period J01 is not constant.

Duration of the period J01 is different for achieving different brightness. At such time, the second bias adjustment stage J5 has not been entered at such time, i.e., the first voltage signal $V_{DVH}$ has not been written to the terminal of the drive transistor DT. Hence, although the effect of bias adjustment varies according to the duration of period, the influence of the voltage of the first voltage signal $V_{DVH}$ on the effect of bias adjustment is small (not zero in practice). In a case that the periods J01 in different display frames have different lengths, the different effects of bias adjustment would still have an impact on the display, for example, results in flashes on the screen.

According to embodiments of the present disclosure, the display panel 000 has multiple display frames when operating, and the multiple display frames includes at least a first display frame XT1 and a second display frame XT2. Each of the first display frame XT1 and the second display frame XT2 may include the data-writing phase and the emission-holding phase. A duty ratio of the effective level of the emitting control signal $V_{EM}$ in the first display frame XT1 is different from a duty ratio of the effective level of the emitting control signal $V_{EM}$ in the second display frame XT2. A structure of the pixel circuit as shown in FIG. 1 to FIG. 3 is taken as an example. The duty ratio of the effective level of the emitting control signal $V_{EM}$ may refer to a proportion of duration of the low level in the emitting control signal $V_{EM}$ in a whole pulse cycle (i.e., total duration of one high-level pulse and one low-level pulse that are adjacent) of the emitting control signal $V_{EM}$. The forgoing scheme of moving the rising edge of the emitting control signal $V_{EM}$ forward (hereinafter referred to as forward dimming) is taken as an example of a means of brightness adjustment. The duty ratio of the effective level of the emitting control signal $V_{EM}$ in the first display frame XT1 is different from the duty ratio of the effective level of the emitting control signal $V_{EM}$ in the second display frame XT, which means duration of a period J01-1 between the rising edge of the emitting control signal $V_{EM}$ and the starting moment of the second bias adjustment stage J2 and in the first display frame XT1 is different from duration of a period J01-2 between the rising edge of the emitting control signal $V_{EM}$ and the starting moment of the second bias adjustment stage J2 in the second display frame XT2. Reference is made to FIG. 11 and FIG. 12. The length of the period J01-1 as shown in FIG. 11 is different from the length of the period J01-2 shown in FIG. 12, which means their duration is different. The first voltage signal in the second bias adjustment stage J5 of the first display frame XT1 is equal to $V_{DVH1}$, the first voltage signal in the second bias adjustment stage J5 of the second display frame XT2 is equal to $V_{DVH2}$, and $V_{DVH1}$ is not equal to $V_{DVH2}$. That is, when the emitting control signal $V_{EM}$ adopts the forward dimming scheme, a voltage of the first voltage signal in the second bias adjustment stage J5 of different display frames is different in a case that the duration of the period between the rising edge of the emitting control signal $V_{EM}$ and the starting moment of the second bias adjustment stage J5 and is different in these display frames Reference is made to FIG. 11 and FIG. 12. Before the second bias adjustment stage J5, the rising edge of the emitting control signal $V_{EM}$ is moved forward. In one embodiment, the duration of the deactivating signal in the emitting control signal $V_{EM}$ becomes longer, the duration of the activating signal in the emitting control signal $V_{EM}$ becomes shorter. In such case, a light-emitting period becomes shorter, and the non-emitting period becomes longer. That is, in such dimming scheme, different brightness corresponds to different lengths of the period between the rising edge of the emitting control signal $V_{EM}$ and the second bias adjustment stage J5. As shown in FIG. 11 and FIG. 12, a length of a period between the first edge Y1 and the fifth edge Y5 is equal to T11 in the first display frame XT1, a length of a period between the first edge Y1 and the fifth edge Y5 is equal to T12 in the second display frame XT2, and T11 is not equal to T12. In FIG. 11 and FIG. 12, it is taken as an example that T11 is greater than T12. In one embodiment, the duty ratio of the effective level of the emitting control signal $V_{EM}$ in the first display frame XT1 is different from the duty ratio of the effective level of the emitting control signal $V_{EM}$ in the second display frame XT2. The brightness of the screen can be adjusted accordingly.

Herein the length T11 of the period between the first edge Y1 and the fifth edge Y5 in the first display frame XT1 is different from the length T12 of the period between the first edge Y1 and the fifth edge Y5 in the second display frame XT2. That is, the duration of the period J01 is different, and thus the effect of bias adjustment is different. Different effects of bias adjustment in different display frames would influence display, for example, introduce flashes on the screen. According to embodiments of the present disclosure, the voltage of the first voltage signal $V_{DVH}$ provided by the terminal DVH in the second bias adjustment stage J5 are adjusted among different display frames. Variation of brightness between different display frames depends on not only duration of a period not influenced by the bias adjustment, but also and the voltage of the first voltage signal $V_{DVH}$. When the duration of the period influenced by the bias adjustment is different among different display frames, the voltage of the first voltage signal $V_{DVH}$ is also adjusted. In one embodiment, through the first switch circuit 102, the issue of the drifted threshold voltage is addressed, the display effect is improved, uniformity and stability of the display brightness are improved among different display frames, and screen flashes are avoided. Better display quality is achieved.

In a light-emitting stage (when $V_{EM}$ is at the low level) during operation of the pixel circuit 10, the potential at the second node N2 receives the first power supply $V_{pvdd}$ provided by the terminal PVDD, and the potential at the first node N1 is equal to $V_{data}-V_{th}$ (i.e., a voltage difference between the data signal and the threshold compensation signal). Until writing the data signal next time, the bias state of the drive transistor DT is generally determined by the voltage difference between the first power supply $V_{pvdd}$ and the data signal $V_{data}$. As long as the data-signal has been written (i.e., after the data-writing stage J2), the potential at the first node N1 is equal to $V_{data}-V_{th}$, and the second node N2 may receive the first voltage signal $V_{DVH}$ provided by the terminal DVH under control of the terminal SCAN1. At such time, the bias state of the drive transistor DT is determined by the voltage difference between the first voltage signal $V_{DVH}$ and the data signal $V_{data}$.

In the forward dimming scheme, a main difference between the first display frame XT1 and the second display frame XT2 lies in the period J01 between the rising edge of the emitting control signal $V_{EM}$ and the starting moment of the second bias adjustment stage J5. Generally, the voltage of the first voltage signal $V_{DVH}$ has few influences on the effect of bias adjustment, because it has not been written to a terminal of the drive transistor DT at such time. What is more influential is the voltage of the first power supply $V_{pvdd}$ provided by the terminal PVDD before the emitting control signal $V_{EM}$ jumps to the high level, i.e., the de-activating signal. When the periods J01 varies among different display frames, the effect of bias adjustment would vary accordingly, which affects the display, e.g., introduces screen flashes. In such case, the voltage of the first power supply $V_{pvdd}$ provided by the terminal PVDD may be adjusted.

Hence, in the forwarding dimming scheme of the emitting control signal $V_{EM}$, the effect of bias adjustment depends on not only the voltage of the first voltage signal $V_{DVH}$ provided by the terminal DVH, but also the voltage of the first power supply $V_{pvdd}$ provided by the terminal PVDD. It is taken as example that the voltage of the first voltage signal $V_{DVH}$ provided by the terminal DVH is adjusted.

In an embodiment, the first power supply $V_{pvdd}$, the data signal $V_{data}$, the first voltage signal $V_{DVH}$, and the length of the period between the two corresponding edges Y1 and Y5 follow the flowing equation for the first display frame XT1 and the second display frame XT2:

$T11\times(V_{pvdd}-V_{data})^2+T00\times(V_{DVH1}-V_{data})^2=T12\times(V_{pvdd}-V_{data})^2+T00\times(V_{DVH2}-V_{data})^2$. TOO is equal to a length of a period between the fourth edge Y4 and the second edge Y2 in the first display frame XT1 and in the second display frame XT2.

When the duty ratio of the emitting control signal $V_{EM}$ is adjusted, the final brightness of the light-emitting apparatus 20 is generally determined by the duration of the period not influenced by the bias adjustment, i.e., by the duration of the period J01 between the rising edge of the emitting control signal $V_{EM}$ and the second bias adjustment stage J5. Hence, the effect of bias adjustment in the period J01 depends on the voltage of the first voltage signal $V_{DVH}$ and the duration of the period J01. In a case that the duration of the period J01 is long, a higher voltage (smaller in absolute value since it is negative) of the first voltage signal $V_{DVH}$ is required. In a case that the duration of the period J01 is short, a lower voltage (greater in absolute value since it is negative) of the first voltage signal $V_{DVH}$ is required.

In one embodiment, the first power supply $V_{pvdd}$, the data signal $V_{data}$, the first voltage signal $V_{DVH1}$, the length T11 of the period between the first edge Y1 and the fifth edge Y5 for the first display frame XT1, and the first power supply $V_{pvdd}$, the data signal $V_{data}$, the first voltage signal $V_{DVH2}$, the length T12 of the period between the first edge Y1 and the fifth edge Y5 for the second display frame XT2, and the length T00 of the period between the fourth edge Y4 and the second edge Y2, may follow the equation:

$$T11\times(V_{pvdd}-V_{data})^2+T00\times(V_{DVH1}-V_{data})^2=T12\times(V_{pvdd}-V_{data})^2+T00\times(V_{DVH2}-V_{data})^2.$$

In such case, the voltage of the data signal $V_{data}$ provided by data line S may be equal between the first display frame XT1 and the second display frame XT2, and the first power supply $V_{pvdd}$ may be different between the first display frame XT1 and the second display frame XT2. In practice, when the length T11 of the period between the first edge Y1 and the fifth edge Y5 in the first display frame XT1 is different from the length T12 of the period between the first edge Y1 and the fifth edge Y5 in the second display frame XT2, the voltage of the first voltage signal $V_{DVH2}$ in the second bias adjustment stage J5 of the second display frame XT2 can be calculated through the foregoing equation according to the voltage of the first voltage signal $V_{DVH1}$ in the second bias adjustment stage J5 of the first display frame XT1. Similarly, the voltage of the first voltage signal $V_{DVH}$ provided by the terminal DVH can be adjusted for another display frame. As shown in FIG. 11 and FIG. 12, the length T11 of the period between the first edge Y1 and the fifth edge Y5 in the first display frame XT1 is greater than the length T12 of the period between the first edge Y1 and the fifth edge Y5 in the second display frame XT2, and hence the voltage of the first voltage signal $V_{DVH1}$ in the second bias adjustment stage J5 of the first display frame XT1 is configured to be higher (e.g., smaller in absolute value) than the voltage of the first voltage signal $V_{DVH2}$ in the second bias adjustment stage J5 of the second display frame XT2. For example, the left part and the right part of the above equation are adjusted to be equal. In one embodiment, screen flashes due to variations in the effect of bias adjustment effect, which are caused by a change in duration of the period influenced by the bias adjustment, among different frames are avoided, and the display quality is improved.

Hereinafter the length T11 of the period between the first edge Y1 and the fifth edge Y5 in the first display frame XT1, and the length T12 of the period between the first edge Y1 and the fifth edge Y5 in the second display frame XT2, are further illustrated in an embodiment.

When the emitting control signal $V_{EM}$ is at the ineffective level (i.e., the high level in this example), the emitting control circuit 101 is deactivated.

Duration of the ineffective level in emitting control signal $V_{EM}$ is equal to T/N×(1−A) in the first display frame XT1, and is equal to T/N×(1−B) in the second display frame XT2. T represents duration of displaying a whole frame, that is, time required to display a complete image on the screen through scanning all pixel lines in the display panel 000. N represents a quantity of pulses of the ineffective level in the emitting control signal $V_{EM}$ within one display frame. In a case that the quantity of the pulses of the ineffective level is identical to a quantity of pulses of the effective level in the emitting control signal $V_{EM}$ within one frame, one pulse of the effective level and one pulse of the ineffective level that are adjacent may be called a pulse group. In such case, N represents a quantity of pulse groups in one display frame, and T/N represents duration of one period of the emitting control signal. The duty ratio A of the effective level of the emitting control signal $V_{EM}$ in the first display frame XT1 is different from the duty ratio B of the effective level of the emitting control signal $V_{EM}$ in the second display frame XT2. The duration of the light-emitting stage in the first display frame XT1 is equal to T/N×A, and the duration of the light-emitting stage in the second display frame XT2 is equal to T/N×B. Accordingly, the duration of the light-emitting stage in the first display frame XT1 and the duration of the light-emitting stage in the second display frame XT2 are also different, which leads to different brightness in the two display frames. The duration of the ineffective level of the emitting control signal $V_{EM}$ in the first display frame XT1 is equal to T/N×(1−A), and hence duration of the non-emitting stage other than the period to be compensated by the bias adjustment in the first display frame XT1 is equal to T/N×(1−A)−T11. The duration of the ineffective level of the emitting control signal $V_{EM}$ in the second display frame XT2 is equal to T/N×(1−B), and hence duration of the non-emitting stage other than the period to be compensated by the bias adjustment in the second display frame XT2 is equal to T/N×(1−B)−T12. In an embodiment, T/N×(1−A)−T11 and T/N×(1−B)−T12 may be configured to be identical. In such case, although the period to be compensated by the bias adjustment is different, the remaining duration is identical between the first display frame XT1 and the second display frame XT2, which prevents duration of another stage introduces a difference in the effect of bias adjustment. In one embodiment, only the voltage of the first voltage signal $V_{DVH}$ is required to be adjusted when addressing the issue of non-uniform brightness in the backward dimming scheme. That is, a scheme of improving the display quality is simplified as much as possible.

In one embodiment, consistency among different display is improved. When the emitting control signal $V_{EM}$ is subject to forward dimming throughout different display frames, the duration of the period J01-1 between the rising edge of the emitting control signal $V_{EM}$ and the starting moment of the second bias adjustment stage J2 in the first display frame XT1 is different from the duration of the period J01-2 between the rising edge of the emitting control signal $V_{EM}$ and the starting moment of the second bias adjustment stage J2 in the second display frame XT2, which introduce a difference in the effect of bias adjustment. Hence, the second bias adjustment stages J5 in different display frames are configured with different voltages of the first voltage signals according to embodiments of the present disclosure, in order to compensate such issue. For example, the voltage of the first voltage signal in the second bias adjustment stages J5 of the first display frame XT1 is equal to $V_{DVH1}$, the voltage of the first voltage signal in the second bias adjustment stages J5 of the second display frame XT2 is equal to $V_{DVH2}$, and $V_{DVH1}$ is set to be not equal to $V_{DVH2}$. Variation of brightness between different display frames depends on not only duration of a period to be compensated by the bias adjustment, but also and the voltage of the first voltage signal $V_{DVH}$. When the duration of the period to be compensated by the bias adjustment is different among different display frames, the voltage of the first voltage signal $V_{DVH}$ is also adjusted. In one embodiment, through the first switch circuit 102, the issue of the drifted threshold voltage is addressed, the display effect is improved, uniformity and stability of the display brightness are improved among different display frames, and screen flashes are avoided. Better display quality is achieved.

A value of the voltage $V_{DVH1}$ of the first voltage signal for the first display frame XT1, a value of the voltage $V_{DVH2}$ of the first voltage signal for the second display frame XT2, and a difference between the two values may be set according to the period J01 between the rising edge of the emitting control signals $V_{EM}$ and the starting moment of the second bias adjustment stage J5 in the corresponding display frames. Details may refer to following embodiments and are not illustrated here.

In the foregoing embodiment(s), brightness of the screen is adjusted through the backward dimming scheme of the emitting control signal $V_{EM}$, where the duration of the period J01 between the rising edge of the emitting control signals $V_{EM}$ and the starting moment of the second bias adjustment stage J5 is different between display frames. In practice, the brightness adjustment is not limited to the forward dimming scheme and may include the backward dimming scheme of the emitting control signal $V_{EM}$. Details of the backward dimming scheme may refer to the foregoing embodiments and are not repeated here.

In one embodiment, in the different dimming schemes such as the forward dimming and the backward dimming of the emitting control signal $V_{EM}$, the voltage of the first voltage signal $V_{DVH}$ provided by the terminal DVH in the bias adjustment stage(s) is configured to be different among different display frames. In one embodiment, inconsistent effects of bias adjustment in the dimming schemes are suppressed among the different display frames. When driving the display panel 000, $V_{pvdd}$ is higher than both $V_{DVH1}$ and $V_{DVH2}$, that is, the voltage of the first power supply $V_{pvdd}$ is greater than the voltage of the first voltage signal $V_{DVH}$ provided by the terminal DVH, and hence the above improvement can be applied. When the first voltage signal $V_{DVH}$ has not been written in the forward dimming scheme of the emitting control signal $V_{EM}$, the voltage of the first power supply $V_{pvdd}$ has a great influence on the effect of bias adjustment, and hence such influence may be compensated later by adjusting the voltage of the first voltage signal $V_{DVH}$. That is, there is a considerable variation in duration of the period J01 before the second bias adjustment stage J5, and such variation may be compensated through adjustment on the voltage of the first voltage signal $V_{DVH}$, which is inputted during the second bias regulation stage J5. Therefore, screen display can be improved through adjusting the voltage of the first voltage signal $V_{DVH}$ when $V_{pvdd}$ is higher than $V_{DVH1}$ and $V_{DVH2}$.

Figure 13:
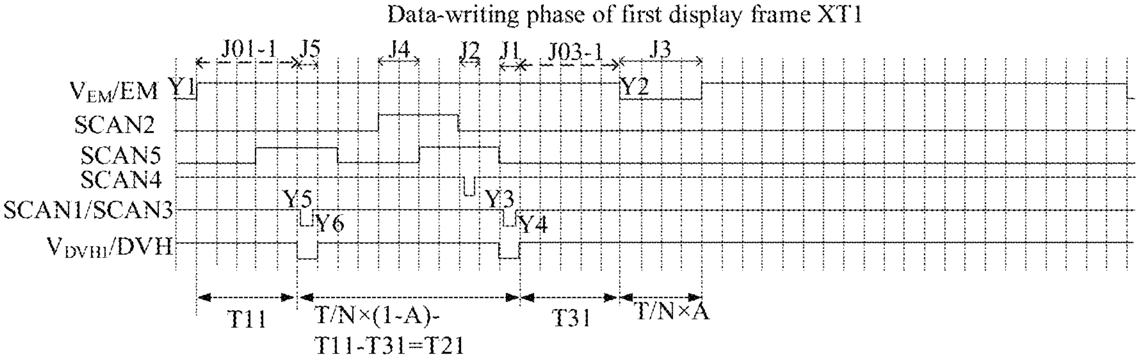
FIG. 13 is a timing diagram of a pixel circuit as shown in FIG. 3 in a data-writing phase of a first display frame according to another embodiment of the present disclosure.
Figure 14:
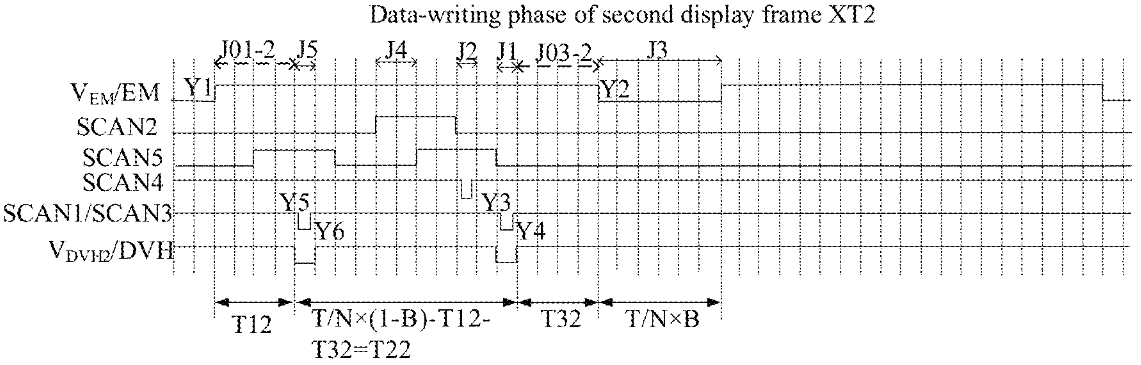
FIG. 14 is a timing diagram of a pixel circuit as shown in FIG. 3 in a data-writing phase of a second display frame according to another embodiment of the present disclosure.

Reference is made to FIGS. 1 to 3, FIG. 7, FIG. 8, FIG. 13, and FIG. 14. FIG. 13 is a timing diagram of the pixel circuit as shown in FIG. 3 in a data-writing phase of a first display frame. FIG. 14 is a timing diagram of the pixel circuit as shown in FIG. 3 in a data-writing phase of second display frame. In an embodiment, both the forward dimming scheme and the backward dimming scheme are applied on the emitting control signal $V_{EM}$. It is assumed that the duration of the period J01-1 between the rising edge of the emitting control signal $V_{EM}$ and the starting moment of the second bias adjustment stage J5 in the first display frame XT1 is different from the duration of the period J01-2 between the rising edge of the emitting control signal $V_{EM}$ and the starting moment of the second bias adjustment stage J5 in the second display frame XT2, and the duration of period J03-1 between the terminating moment of the first bias adjustment stage J1 and the falling edge of the emitting control signal $V_{EM}$ in the first display frame XT1 is different from the duration of period J03-2 between the terminating moment of the first bias adjustment stage J1 and the falling edge of the emitting control signal $V_{EM}$ in the XT2. In the first display frame XT1, the length of the period between the fifth edge Y5 and the fourth edge Y4 is equal to T21, and there is $T/N\times(1-A)=T11+T21+T31$. In the second display frame XT2, the length of the period between the fifth edge Y5 and the fourth edge Y4 is T22, and there is $T/N\times(1-B)=T12+T22+T32$. T represents duration of displaying a whole frame, that is, time required to display a complete image on the screen through scanning all pixel lines in the display panel 000. N represents a quantity of pulses of the ineffective level in the emitting control signal $V_{EM}$ within one display frame. In a case that the quantity of the pulses of the ineffective level is identical to a quantity of pulses of the effective level in the emitting control signal $V_{EM}$ within one frame, one pulse of the effective level and one pulse of the ineffective level that are adjacent may be called a pulse group. In such case, N represents a quantity of pulse groups in one display frame, and T/N represents duration of one period of the emitting control signal. A represents the duty ratio of the effective level of the emitting control signal $V_{EM}$ in the first display frame XT1, and B represents the duty ratio of the effective level of the emitting control signal $V_{EM}$ in the second display frame XT2. $T/N\times(1-A)$ represents the duration of the ineffective level of the emitting control signal $V_{EM}$ in the first display frame XT1. $T/N\times(1-B)$ represents the duration of the ineffective level of the emitting control signal $V_{EM}$ in the second display frame XT2.

Reference is made to FIGS. 1 to 5. In an embodiment, there are i pulses of the ineffective level and (i+1) pulses of the effective level in the emitting control signal $V_{EM}$ within one emission-holding phase. The pulse of the ineffective level may be regarded as the deactivating signal, and the pulse of the effective level may be regarded as the activating signal. In the emission-holding phase, the data control signal $V_{SCAN4}$ provided by the terminal SCAN4 is the deactivating signal which disconnects the first terminal and the second terminal of the data-writing circuit 104. Herein i is an integer greater than or equal to one. One display frame may include the data-writing stage and the emission-holding phase which is subsequent to the data writing operation. One data-refreshing cycle may include one data-writing phase and one or more emission-holding phases. In the pixel circuit 10 of the display panel 000, the data-writing circuit 104 for data writing and the first switch circuit 102 for bias adjustment are independently configured, and hence the bias state may be adjusted in both the data-writing stage and the emission-holding phase of the display frame. That is, the data-writing phase of the display frame may include the first bias adjustment stage J1, the emission-holding phase of the display frame may include the first bias adjustment stage J1, or both the data-writing phase and the emission-holding phase of the display frame may include the first bias adjustment stage J1. Since the data-writing circuit 104 for data writing and the first switch circuit 102 for bias adjustment are set independently, the voltage of the first voltage signal $V_{DVH}$ may be adjusted in the first bias adjustment stage J1 of the data-writing phase throughout different display frames. In the emission-holding phase of the display frame, the data control signal $V_{SCAN4}$ provided by the terminal SCAN4 is the deactivating signal disconnecting the first terminal and the second terminal of the data-writing circuit 104, and it is not necessary to apply the data signal $V_{data}$ provided by the data line S to the first terminal of the drive transistor DT. Hence, the voltage of the first voltage signal $V_{DVH}$ may be adjusted in the first bias adjustment stages J1 of the emission-holding phase of throughout different display frames.

In one embodiment, the data-writing circuit 104 for data writing and the first switch circuit 102 for bias adjustment are independently configured in the pixel circuit 10. When brightness is adjusted through the emitting control signal $V_{EM}$, the effect of the bias adjustment is different in different display frames due to different duration of the period influence by the bias adjustment. The voltage of the first voltage signal $V_{DVH}$ may be adjusted in both first bias adjustment stages J1 of the data-writing phase and the emission-holding phase of the display frame. In one embodiment, the data-writing operation of the display panel 000 is less affected, which facilitates ensuring normal display of the display panel 000.

Figure 15:
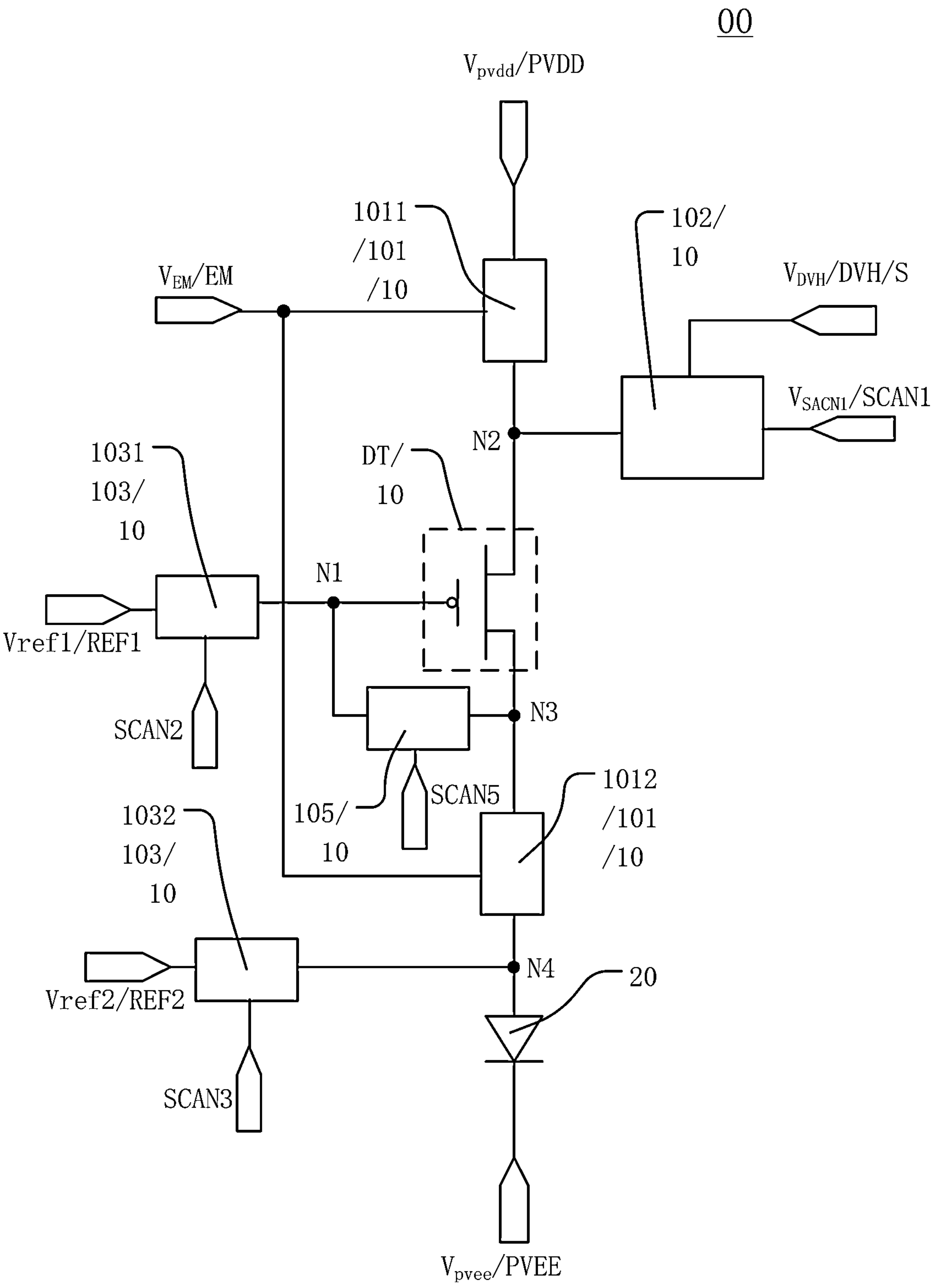
FIG. 15 is a schematic structural diagram of electrical connection in a pixel circuit of a display panel as shown in FIG. 1 according to another embodiment of the present disclosure.
Figure 16:
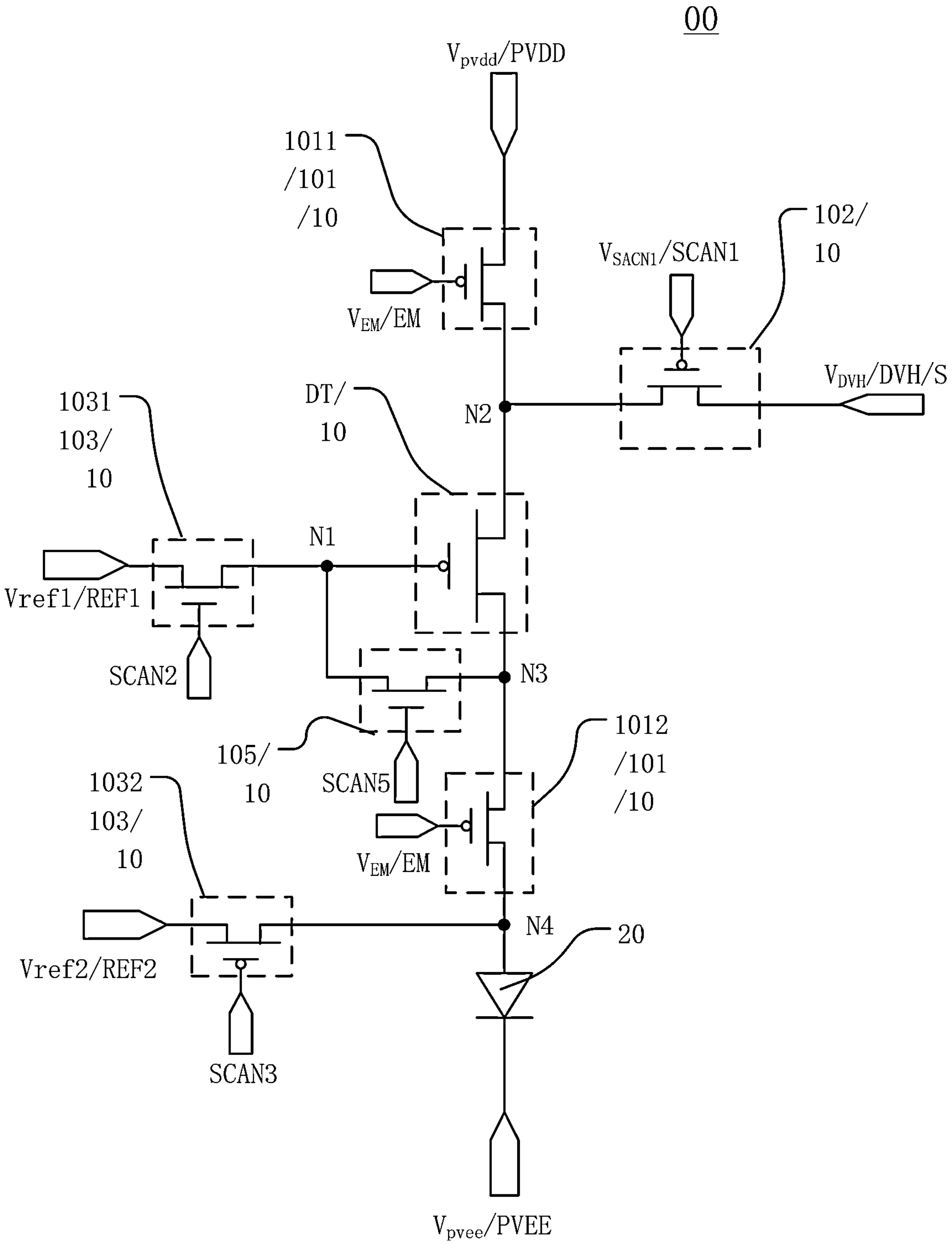
FIG. 16 is a schematic structural diagram of electrical connection between a pixel circuit and a light-emitting apparatus as shown in FIG. 15 according to an embodiment of the present disclosure.
Figure 17:
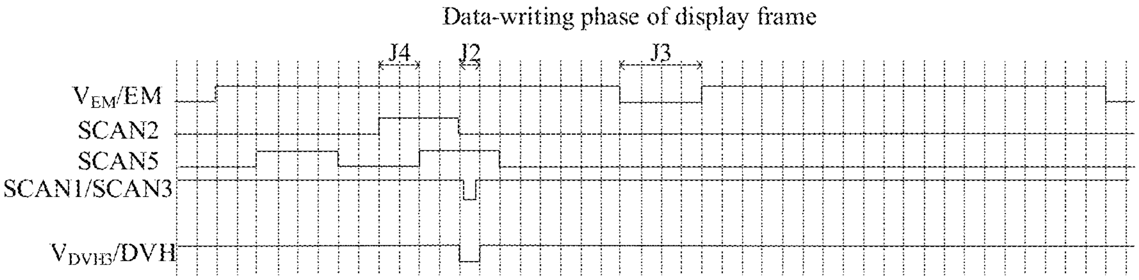
FIG. 17 is a timing diagram of a pixel circuit as shown in FIG. 16 in a data-writing phase of a display frame according to an embodiment of the present disclosure.
Figure 18:
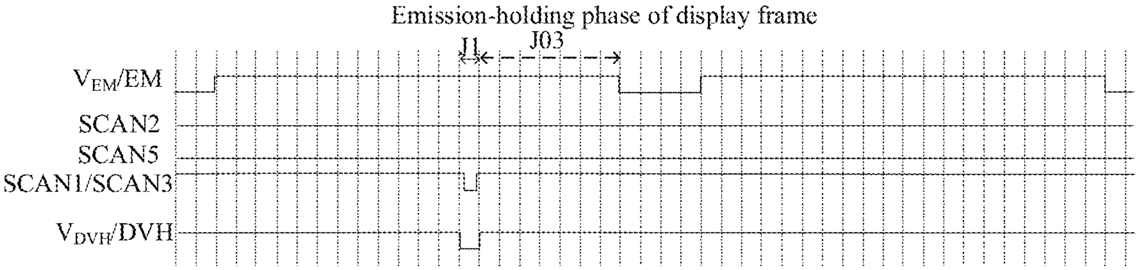
FIG. 18 is a timing diagram of the pixel circuit as shown in the FIG. 16 in an emission-holding phase of a display frame according to an embodiment of the present disclosure.
Figure 19:
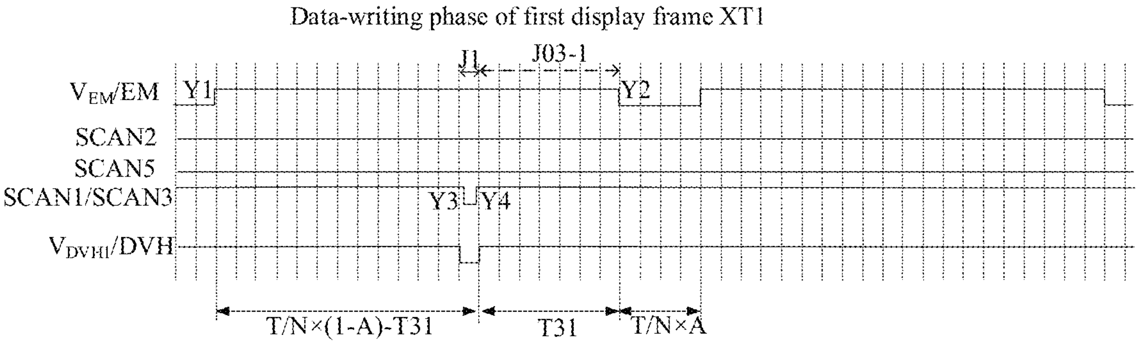
FIG. 19 is a timing diagram of a pixel circuit as shown in the FIG. 16 in a data-writing phase of a first display frame according to an embodiment of the present disclosure.
Figure 20:
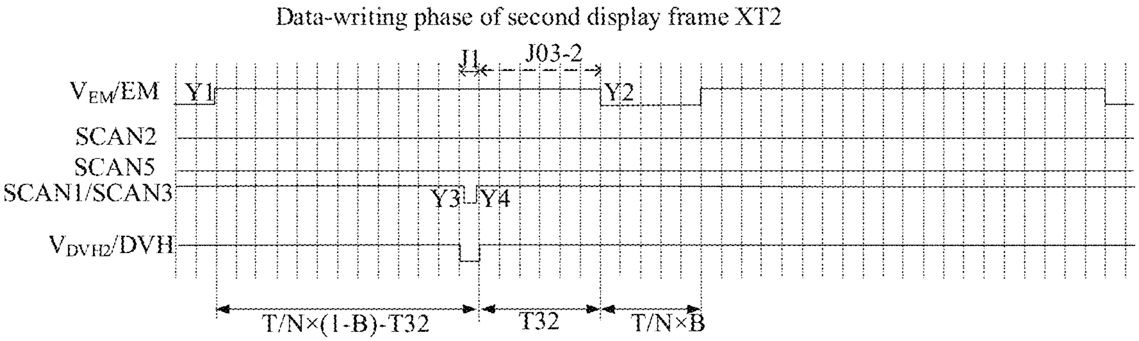
FIG. 20 is a timing diagram of a pixel circuit as shown in the FIG. 16 in a data-writing phase of a second display frame according to an embodiment of the present disclosure.

Reference is made to FIG. 1, and FIGS. 15 to 20. FIG. 15 is a schematic structural diagram of electrical connection of the pixel circuit as shown in FIG. 1. FIG. 16 is a schematic structural diagram of electrical connection between the pixel circuit and the light-emitting apparatus as shown in FIG. 15. FIG. 17 is a timing diagram of the pixel circuit as shown in FIG. 16 in a data-writing phase of a display frame. FIG. 18 is a timing diagram of the pixel circuit as shown in FIG. 16 operating in an emission-holding phase of a display frame. FIG. 19 is a timing diagram of the pixel circuit as shown in 16 in an emission-holding phase of a first display frame. FIG. 20 is a timing diagram of the pixel circuit as shown in FIG. 16 in an emission-holding phase of a second display frame. In an embodiment, the display frame includes the data-writing phase and the emission-holding phase. In one display frame, there are i pulses of the ineffective level and i pulses of the effective level in the emitting control signal, the pulses of the ineffective level alternate with the pulses of the effective level, and i is greater than or equal to two. The pulses of ineffective may be regarded as deactivating signals, while the pulses of the effective level may be regarded as activating signals.

The data-writing phase of the display frame includes the $1^{st}$ pulse of the ineffective level of the emitting control signal $V_{EM}$. During such pulse, the first switch circuit 102 is configured to write the data signal. That is, the first switch circuit 102 is activated, the voltage of the first voltage signal $V_{DVH}$ provided by the terminal DVH is equal to $V_{DVH3}$, and $V_{DVH3}$ is applied to the gate of the drive transistor DT. In such case, $V_{DVH3}$ is the data signal to be written to the drive transistor.

The emission-holding phase of the display frame includes an $N^{th}$ pulse of the ineffective level of the emitting control signal $V_{EM}$. During such pulse, the emission-holding phase includes the foregoing first bias adjustment stage J1, and the first switch circuit 102 is configured to write the bias adjustment signal. That is, the first switch circuit 102 is activated, the voltage of the first voltage signal $V_{DVH}$ provided by the terminal DVH is transmitted to the terminal of the drive transistor DT. $V_{DVH3}$ may be neither equal to $V_{DVH1}$ nor equal to $V_{DVH2}$. N is a positive integer less than or equal to i.

In one embodiment, the display frame includes the data-writing phase and the emission-holding phase after the data writing operation, and one data-refreshing cycle includes one data-writing phase and one or more emission-holding phases. In the pixel circuit 10 of the display panel 000, the first switch circuit 102 is configured for not only data writing but also bias adjustment. In such case, the bias adjustment is feasible only during the emission-holding phases.

During the data-writing phase of the display frame, the first switch circuit 102 is configured to write the data signal, and the data-writing stage J2 is arranged in the $1^{st}$ pulse of the ineffective level of the light-emitting-maintaining signal $V_{EM}$. During such stage, the voltage $V_{DVH3}$ of the first voltage signal $V_{DVH}$ provided by the terminal DVH serves as the data signal applied to the gate of the drive transistor DT, and the data-writing operation of the pixel circuit 10 can be implemented.

During the emission-holding phase of the display frame, the first switch circuit 102 is configured to adjust the bias state, that is, the emission-holding phase of the display frame includes the first bias adjustment stage J1 arranged in an $N^{th}$ pulse of the ineffective level of the emitting control signal $V_{EM}$. During such stage, the voltage of the first voltage signal $V_{DVH}$ provided by the terminal DVH serves as the bias adjustment signal applied to the first terminal of the drive transistor DT, and to the bias adjustment operation of the pixel circuit 10 can be implemented.

In one embodiment, the first switch circuit 102 is configured for not only data writing but also bias adjustment in the pixel circuit 10. When the brightness is adjusted through the emitting control signal $V_{EM}$, the effect of the bias adjustment is different among different display frames due to the different duration of the period influenced by the bias adjustment. The voltage of the first voltage signal $V_{DVH}$ in the first bias adjustment stage J1 of the emission-holding phase is adjusted. That is, in the first bias adjustment stage J1 of the emission-holding phase, the first voltage signal provided by the terminal DVH is equal to $V_{DVH1}$ in the first display frame XT1 while equal to $V_{DVH2}$ in the second display frame XT2, and $V_{DVH1}$ is not equal to $V_{DVH2}$ (as shown in FIG. 19 and FIG. 20). The length T31 of the period between the second edge Y2 and the fourth edge Y4 during the emission-holding phase of the first display frame XT1 may be different from the length T32 of the period between the second edge Y2 and the fourth edge Y4 during the emission-holding phase in the second display frame XT2. That is, the duration of the period influenced by the bias adjustment may be different during the emission-holding phase. In such case, the effect of the bias adjustment is likely to be different in different display frames, which affects the display, e.g., introduces scree flashes. Herein the voltage of the first voltage signal $V_{DVH}$ provided by the terminal DVH in the first bias adjustment stage J1 of the emission-holding phases is configured to be different under different display frames. In one embodiment, the display effect of the screen can be ensured, while the data-writing operation of the display panel 000 during the data-writing phase would not be affected in different display frames. The normal display of the display panel 000 is guaranteed.

During the data-writing phase of the display frame, the voltage $V_{DVH3}$ of the first voltage signal $V_{DVH}$ provided by the terminal DVH serve as the data signal applied to the gate of the drive transistor DT, and the data-writing operation of the pixel circuit 10 can be implemented. The voltage $V_{DVH3}$ is different from that of the first voltage signal $V_{DVH}$ in the first bias adjustment stage J1 of the emission-holding phase (e.g., the voltage $V_{DVH1}$ for the first display frame XT1 and the voltage $V_{DVH2}$ for the second display frame XT2).

Figure 21:
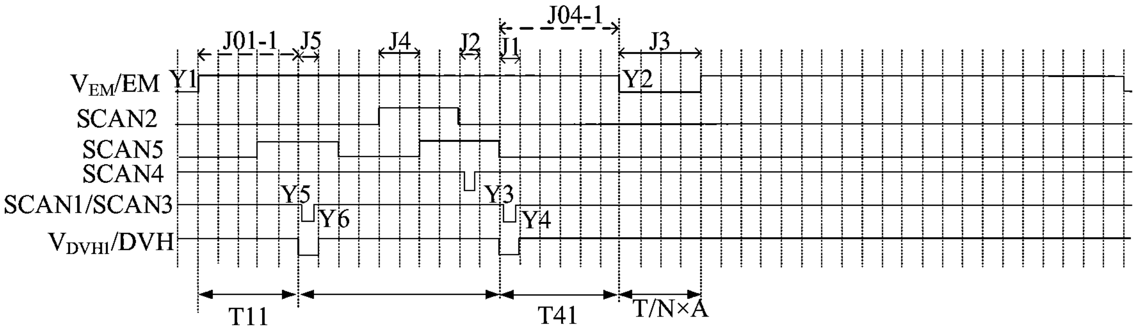
FIG. 21 is a timing diagram of a pixel circuit as shown in FIG. 3 in a data-writing phase of a first display frame according to another embodiment of the present disclosure.
Figure 22:
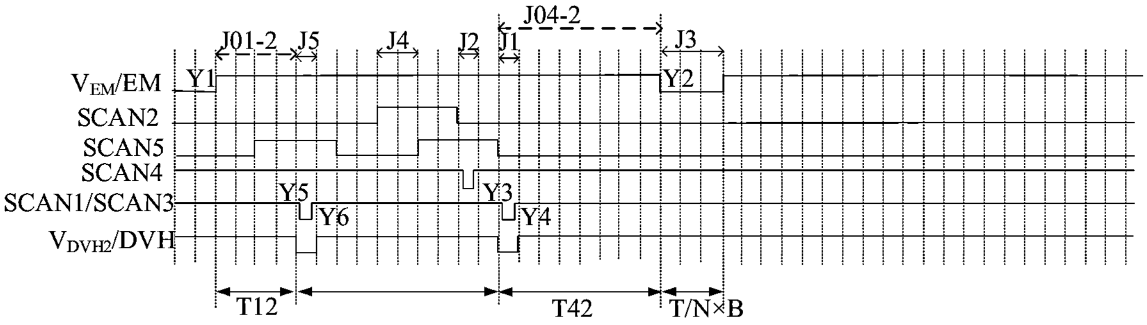
FIG. 22 is a timing diagram of a pixel circuit as shown in FIG. 3 in a data-writing phase of a second display frame according to another embodiment of the present disclosure.

Reference is made to FIGS. 1 to 5, FIG. 21, and FIG. 22. FIG. 21 is a timing diagram of the pixel circuit as shown in FIG. 3 in a data-writing phase of a first display frame. FIG. 22 is a timing diagram of the pixel circuit as shown in FIG. 3 in a data-writing phase of a second display frame. In an embodiment, the length of the period between the second edge Y2 and the third edge Y3 is equal to T41 in the first display frame XT1 and is equal to T42 in the second display frame XT2, and T41 is not equal to T42.

When the brightness is adjusted through the emitting control signal $V_{EM}$, the duty ratio of the effective level of the emitting control signal $V_{EM}$ in the first display frame XT1 is set to be different from the duty ratio of the effective level of the emitting control signal $V_{EM}$ in the second display frame XT2. When being driven, the display panel 000 may be in a special mode, e.g., a low grayscale mode, and a voltage of the data signal $V_{data}$ is close to or lower than the voltage of the first power supply $V_{pvdd}$. In such case, a voltage difference between the gate and the first terminal of the drive transistor DT approaches the threshold voltage $V_{th}$, and the bias state has a small influence. In a case that the voltage of the first voltage signals $V_{DVH}$ is adjusted among different display frames, an influence on the bias adjustment is also significantly reduced. It is highly likely that the voltage $V_{DVH1}$ for the first display frame XT1 is approximately equal to the voltage $V_{DVH2}$ for the second display frame XT2. In such case, the different duration of the period influenced by the bias adjustment duration (i.e., the period J03) under different brightness introduces different effects of the bias adjustment, and thus affects an effect of the display. In order to address the above issue, the moment at which the first voltage signal $V_{DVH}$ is applied to the terminal of the drive transistor DT through the first switch circuit 102 under control of the first control signal SCAN1 (that is, at which the first control signal $V_{SCAN1}$ becomes the activating signal) is adjusted to alter the effect of bias adjustment. In an embodiment, the duty ratio of the effective level of the emitting control signal $V_{EM}$ in the first display frame XT1 is different from the duty ratio of the effective level of the emitting control signal $V_{EM}$ in the second display frame XT2. The backward dimming scheme of the emitting control signal $V_{EM}$ is taken as an example. Duration of the period J04-1 between the starting moment of the first bias adjustment stage J1 and the falling edge of the emitting control signal $V_{EM}$ in the first display frame XT1 is different from duration of the period J04-2 between the starting moment of the first bias adjustment stage J1 and the falling edge of the emitting control signal $V_{EM}$ in the second display frame XT2. Thus, when adjusting the voltage of the first voltage signal $V_{DVH}$ has limited effect, the period between the moment at which the first control signal $V_{SCAN1}$ becomes the activating signal and the immediate subsequent moment at which the emitting control signal $V_{EM}$ becomes the activating signal may be adjusted. In an embodiment, the display frame further includes the second bias adjustment stage J5. The forward dimming scheme of the emitting control signal $V_{EM}$ is taken as an example. Duration of the period J01-1 between the starting moment of the second bias adjustment stage J5 in the first display frame XT1 and the previous rising edge of the emitting control signal $V_{EM}$ is different from the duration of the period J01-2 between the starting moment of the second bias adjustment stage J5 in the second display frame XT2 and the previous rising edge of the emitting control signal $V_{EM}$. Thus, when adjusting the voltage of the first voltage signal $V_{DVH}$ has limited effect, the period between the moment at which the first control signal $V_{SCAN1}$ becomes the activating signal and the immediate previous moment at which the last emitting control signal $V_{EM}$ becomes the deactivating signal may be adjusted.

Reference is made to FIG. 21 and FIG. 22. The period J04-1 between the starting moment of the first bias regulation stage J1 and the falling edge of the emitting control signal $V_{EM}$ in the first display frame XT1 has a length T41 between the second edge Y2 and the third edge Y3. The period J04-2 between the starting moment of the first bias adjustment stage J1 and the falling edge of the emitting control signal $V_{EM}$ in the second display frame XT2 has a length T42 between the second edge Y2 and the third edge Y3. The period J01-1 between the starting moment of the second bias adjustment stage J5 in the first display frame XT1 and the last rising edge of the emitting control signal $V_{EM}$ has a length of T11 between the first edge Y1 and the fifth edge Y5. The period J01-2 between the starting moment of the second bias adjustment stage J5 in the second display frame XT2 and the last rising edge of the emitting control signal $V_{EM}$ has a length of the period T12 between the first edge Y1 and the fifth edge Y5. In such case, the first power supply $V_{pvdd}$, the data signal $V_{da}$ta, the first voltage signal $V_{DVH}$, the length of the period between the first edge Y1 and the fifth edge Y5, and the length of the period between the second edge Y2 and the third edge Y3 follow a following equation in the first display frame XT1 and the second display frame XT2.

$$T11\times(V_{pvdd}-V_{data})^2+(V_{DVH1}-V_{data})^2\times T41=T12\times(V_{pvdd}-V_{data})^2+(V_{DVH2}-V_{data})^2\times T42$$

When the first voltage signal $V_{DVH1}$ for the first display frame XT1 is approximately equal to the first voltage signal $V_{DVH2}$ for the second display frame XT2, adjusting the voltage of the first voltage signal $V_{DVH}$ only is no longer adequate to improve the effect of threshold compensation. In such case, the length T42 of the period J04-2 between the second edge Y2 and the third edge Y3 in the second display frame XT2 may be calculated through the foregoing equation based on the length T41 of the period J04-1 between the second edge Y2 and the third edge Y3 in the first bias regulation stage J1. Similarly, the effect of threshold compensation may be adjusted for another display frame. As shown in FIG. 21 and FIG. 22, it is assumed that the length T11 of the period between the first edge Y1 and the fifth edge Y5 in the first display frame XT1 is greater than the length T12 of the period between the first edge Y1 and the fifth edge Y5 in the second display frame XT2. In such case, the length T42 of the period J04-2 between the starting moment of the first bias adjustment stage J1 and the falling edge of the emitting control signal $V_{EM}$ in the second display frame XT2 may be calculated based on the length T41 of the period J04-1 between the starting moment of the first bias regulation stage J1 and the falling edge of the emitting control signal $V_{EM}$ in the first display frame XT1. For example, the left part and the right part of the above equation are adjusted to be equal. In one embodiment, screen flashes due to variations in the effect of bias adjustment effect, which are caused by a change in duration of the period influenced by the bias adjustment, among different frames are avoided, and the display quality is improved.

Reference is made to FIGS. 1 to 5, FIG. 21, and FIG. 22. In an embodiment, a voltage of the first power supply provided by the terminal PVDD is equal to $V_{pvdd1}$ in the first display frame XT1 and is $V_{pvdd2}$ in the second display frame XT2, and $V_{pvdd1}$ is not equal to $V_{pvdd2}$.

In one embodiment, when the forward dimming scheme of the emitting control signal $V_{EM}$ is applied for driving the display panel 000, a main difference between the first display frame XT1 and the second display frame XT2 lies in the period J01 between the rising edge of the emitting control signal $V_{EM}$ and the starting moment of the second bias adjustment stage J5. Generally, the voltage of the first voltage signal $V_{DVH}$ has few influences on the effect of bias adjustment, because it has not been written to a terminal of the drive transistor DT at such time. What is more influential is the voltage of the first power supply $V_{pvdd}$ provided by the terminal PVDD before the emitting control signal $V_{EM}$ jumps to the high level, i.e., the de-activating signal. When the periods J01 varies among different display frames, the effect of bias adjustment would vary accordingly, which affects the display, e.g., introduces screen flashes. In such case, the voltage of the first power supply $V_{pvdd}$ provided by the terminal PVDD may be adjusted. In an embodiment, the voltage of the first power supply provided by the terminal PVDD is equal to $V_{pvdd1}$ in the first display frame XT1 and is equal to $V_{pvdd2}$ in the second display frame XT2, and $V_{pvdd1}$ is not equal to $V_{pvdd2}$. In an embodiment, the effect of the bias adjustment among different display frames may be improved through adjusting the length of the period between the second edge Y2 and the third edge Y3, i.e., the period J04 between the starting moment of the first bias adjustment stage J1 and the falling edge of the emitting control signal $V_{EM}$. In one embodiment, better display quality can be achieved.

In an embodiment, the first power supply $V_{pvdd}$, the data signal $V_{data}$, the first voltage signal $V_{DVH}$, the length of the period between the first edge Y1 and the fifth edge Y5, and the length of the period between the second edge Y2 and the third edge Y3 may follow a following step in the first display frame XT1 and the second display frame XT2.

$$T11\times(V_{pvdd1}-V_{data})^2+(V_{DVH1}-V_{data})^2\times T41=T12\times(V_{pvdd2}-V_{data})^2+(V_{DVH2}-V_{data})^2\times T42$$

When adjusting the voltage of the first voltage signal $V_{DVH}$ only is no longer adequate for improving the effect of bias compensation, the voltage of the first power supply $V_{pvdd}$ provided by the terminal PVDD may be adjusted among different display frames. The length T42 of the period J04-2 between the second edge Y2 and the third edge Y3 in the second display frame XT2 may be calculated through the foregoing equation based on the first power supply $V_{pvdd1}$ in the first display frame XT1 and the length T41 of the period J04-1 between the second edge Y2 and the third edge Y3 in the first display frame XT1. Similarly, the effect of threshold compensation may be adjusted for another display frame. As shown in FIG. 21 and FIG. 22, it is assumed that the length T11 of the period between the first edge Y1 and the fifth edge Y5 in the first display frame XT1 is greater than the length T12 of the period between the first edge Y1 and the fifth edge Y5 in the second display frame XT2, and $V_{pvdd1}$ is greater than $V_{pvdd2}$. The length T42 of the period J04-2 between the starting moment of the first bias adjustment stage J1 and the falling edge of the emitting control signal $V_{EM}$ in the second display frame XT2 may be calculated based on the length T41 of the period J04-1 between the starting moment of the first bias regulation stage J1 and the falling edge of the emitting control signal $V_{EM}$ in the first display frame XT1. For example, the left part and the right part of the above equation are adjusted to be equal. In one embodiment, screen flashes due to variations in the effect of bias adjustment effect, which are caused by a change in duration of the period influenced by the bias adjustment, among different frames are avoided, and the display quality is improved.

Figure 23:
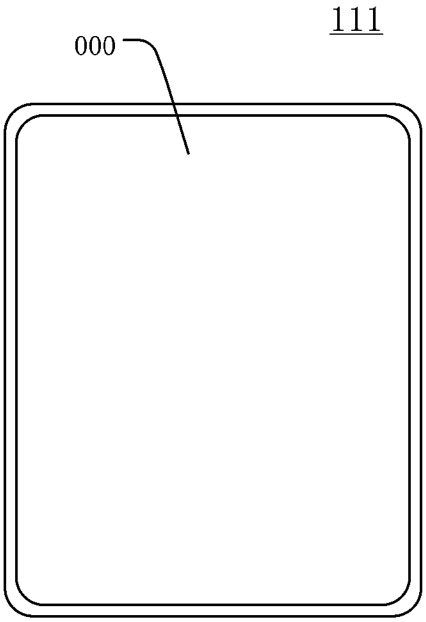
FIG. 23 is a schematic structural diagram of a display apparatus according to an embodiment of the present disclosure.

Reference is made to FIG. 23, which is a schematic structural diagram of a display apparatus according to an embodiment of the present disclosure. The display apparatus 111 provided includes the display panel 000 according to any foregoing embodiment as illustrated in a combination of FIGS. 1 to 3 or a combination of FIGS. 1, 15, and 16. The display panel is driven through the method for driving the display panel according to any foregoing embodiment. In FIG. 23, a mobile phone is taken as an example to illustrate the display apparatus 111. The display apparatus 111 may be a display device having a display function, e.g., a computer, a television, a vehicle display device, and the like, which is not limited herein. The display apparatus 111 is capable to achieve the same beneficial effect(s) as the method for driving the display panel according to any foregoing embodiment. These effects may refer to the description of the foregoing embodiments and would not be repeated herein.

Therefore, the method for driving the display panel and the display apparatus provided herein have at least following beneficial effects.

The method provided herein is applicable to an active-matrix display panel that includes multiple sub-pixels, and each sub-pixel includes a light-emitting apparatus and a pixel circuit electrically connected to the light-emitting apparatus. The pixel circuit is configured to generate a drive current for driving the light-emitting apparatus to emit light. The pixel circuit includes at least the emitting control circuit, the drive transistor and the first switch circuit. A control terminal of the first switch circuit is electrically connected to a terminal for providing the first control signal, the first terminal of the first switch circuit is electrically connected a terminal for providing the first voltage signal, and the second terminal of the first switch circuit is electrically connected to the terminal of the drive transistor. The first switch circuit may be configured to adjust a bias state of the drive transistor. The first switch circuit is controlled to write the first voltage signal into the terminal of the drive transistor in an operation stage of the pixel circuit, and the bias state of the drive transistor is adjusted for suppressing a drift of a threshold voltage of the drive transistor. In one embodiment, an influence of threshold drift on display quality can be reduced, and thus display effect is improved. The display frames of the display panel include the first display frame and the second display frame. The duty ratio of the effective level of the emitting control signal may be configured to be different between the first display frame and the second display frame for adjusting brightness of a screen. In such case, the voltage of the first voltage signal in the first bias adjustment state is also configured to be different between the first display frame and the second display frame. Therefore, when driving the display panel, the voltage of the first voltage signal can be adjusted when the adjusted bias state last for different periods in different display frames. In one embodiment, the issue of the drifted threshold voltage is addressed, the display effect is improved, uniformity and stability of the display brightness are also improved under different scanning modes, and screen flashes are avoided. Better display quality can be achieved.

Hereinabove the embodiments of the present disclosure are described as some examples. The above examples are for illustrative purposes only and are not intended for limiting the scope of the present disclosure. Modifications may be made to the above embodiments without departing from the scope and the spirit of the present disclosure. The scope of the present disclosure is defined by the appended claims.

The invention claimed is:

1. A method for driving a display panel, wherein:

the display panel comprises a plurality of pixel circuits, each pixel circuit of the plurality of pixel circuits comprises an emitting control circuit, a drive transistor, a first switch circuit;

the emitting control circuit is electrically connected to the drive transistor, and a control terminal of the emitting control circuit is configured to receive an emitting control signal;

a control terminal of the first switch circuit is configured to receive a first control signal, a first terminal of the first switch circuit is configured to receive a first voltage signal, and a second terminal of the first switch circuit is electrically connected to a terminal of the drive transistor;

each display frame of the display panel comprises a first bias adjustment stage;

the method comprises: controlling, through the first control signal in the first bias adjustment stage, the first switch circuit to transmit the first voltage signal to the terminal of the drive transistor;

a duty ratio of an effective level of the emitting control signal in a first display frame of the display panel is different from the duty ratio of the effective level of the emitting control signal in a second display frame of the display panel; and the first voltage signal is equal to $V_{DVH1}$ in the first bias adjustment stage of the first display frame and is equal to $V_{DVH2}$ in the first bias adjustment stage of the second display frame, and $V_{DVH1}$ is not equal to $V_{DVH2}$.

2. The method according to claim 1, wherein:

the display panel further comprises a data-writing circuit;

a control terminal of the data-writing circuit is configured to receive a data control signal, a first terminal of the data-writing circuit is electrically connected to a data line, and a second terminal of the data-writing circuit is electrically connected to a first terminal of the drive transistor;

each display frame of the display panel comprises a data-writing phase and an emission-holding phase;

during the data-writing phase, the emitting control signal is subject to a pulse of an ineffective level of the emitting control signal, and the pulse of the ineffective level of the emitting control signal has a first edge and a second edge subsequent to the first edge;

the data-writing phase comprises a data-writing stage and the first bias adjustment stage, and the first bias adjustment is subsequent to the data-writing stage;

during the data-writing stage, a data signal provided by the data line is transmitted to the first terminal of the drive transistor under control of the data control signal;

during the first bias adjustment stage, the first control signal is subject to a pulse of an effective level of the first control signal, and the pulse of the effective level of first control signal has a third edge and a fourth edge subsequent to the third edge;

the fourth edge is precedent to the second edge; and a length of a period between the second edge and the fourth edge is equal to T31 in the first display frame and is equal to T32 in the second display frame, and T31 is not equal to T32.

3. The method according to claim 2, wherein:

the display panel further comprises a reset circuit;

a control terminal of the reset circuit is configured to receive a reset signal, a first terminal of the reset circuit is configured to receive a reset voltage, and a second terminal of the reset circuit is electrically connected to a gate of the drive transistor;

a first terminal of the emitting control circuit is configured to receive a first power supply, the first power supply is transmitted to the first terminal of the drive transistor under control of the emitting control signal during the emission-holding phase;

each display frame of the display panel further comprises a second bias adjustment stage and a reset stage, the reset stage is precedent to the data-writing stage, and the second bias adjustment stage is precedent to the reset stage;

during the second bias adjustment stage, the first control signal is at subject to another pulse of the effective level of the first control signal, and the another pulse of the effective level of the first control signal has a fifth edge and a sixth edge subsequent to the fifth edge;

the fifth edge is subsequent to the first edge, and the sixth edge is precedent to the third edge; and a length of a period between the first edge and the fifth edge is equal to T11 in the first display frame and is equal to T12 in the second display frame, and T11 is not equal to T12.

4. The method according to claim 3, wherein:

a length of a period between the fourth edge and the second edge is equal to T00 in both the first display frame and the second display frame; and $T11\times(V_{pvdd}-V_{data})^2+T00\times(V_{DVH1}-V_{data})^2=T12\times(V_{pvdd}-V_{data})^2+T00\times(V_{DVH2}-V_{data})^2$, wherein $V_{data}$ represents the data signal, and $V_{pvdd}$ represents the first power supply.

5. The method according to claim 4, wherein:

the emitting control circuit is deactivated in response to the emitting control signal being at the ineffective level of the emitting control signal;

duration of the ineffective level for the emitting control signal is equal to T/N×(1−A) in the first display frame and is equal to T/N×(1−B) in the second display frame, wherein T/N represents duration of a period of the emitting control signal, A represents the duty ratio of the effective level of the emitting control signal in the first display frame, and B represents the duty ratio of the effective level of the emitting control signal in the second display frame; and $$T/N\times(1-A)-T11=T/N\times(1-B)-T12.$$

6. The method according to claim 4, wherein $V_{pvdd}$ is greater than $V_{DVH1}$ and is greater than $V_{DVH2}$.

7. The method according to claim 3, wherein:

a length of the period between the second edge and the third edge is equal to T41 in the first display frame and is equal to T42 in the second display frame, and T41 is not equal to T42.

8. The method according to claim 7, wherein:

$T11\times(V_{pvdd}-V_{data})^2+(V_{DVH1}-V_{data})^2\times T41=T12\times(V_{pvdd}-V_{data})^2+(V_{DVH2}-V_{data})^2\times T42$, wherein $V_{data}$ represents the data signal, and $V_{pvdd}$ represents the first power supply.

9. The method according to claim 3, wherein:

a voltage of the first power supply is equal to $V_{pvdd1}$ in the first display frame and is equal to $V_{pvdd2}$ in the second display frame, and $V_{pvdd1}$ is equal to $V_{pvdd2}$.

10. The method for driving the display panel according to claim 9, wherein $T11\times(V_{pvdd1}-V_{data})^2+(V_{DVH1}-V_{data})^2\times T41=T12\times(V_{pvdd2}-V_{data})^2+(V_{DVH2}-V_{data})^2\times T42$, wherein $V_{data}$ represents the data signal.

11. The method according to claim 3, wherein:

a length of the period between the fifth edge and the fourth edge is equal to T21 in the first display frame and is equal to T22 in the second display frame, T/N×(1−A)=T11+T21+T31, and T/N×(1−B)=T12+T22+T32;

wherein T represents duration of the display panel displaying a whole frame, N represents a quantity pulses of the ineffective level for the emitting control signal in the whole frame, T/N represents duration of a period of the emitting control signal, A represents the duty ratio of the effective level of the emitting control signal in the first display frame, and B represents the duty ratio of the effective level of the emitting control signal in the second display frame.

12. The method according to claim 2, wherein:

$T31\times(V_{DVH1}-V_{data})^2=T32\times(V_{DVH2}-V_{data})^2$, wherein $V_{data}$ represents the data signal.

13. The method according to claim 3, the emitting control circuit is deactivated in response to the emitting control signal being at the ineffective level of the emitting control signal;

duration of the ineffective level for the emitting control signal is equal to T/N×(1−A) in the first display frame and is equal to T/N×(1−B) in the second display frame, wherein T/N represents duration of a period of the emitting control signal, A represents the duty ratio of the effective level of the emitting control signal in the first display frame, and B represents the duty ratio of the effective level of the emitting control signal in the second display frame; and $$T/N\times(1-A)-T31=T/N\times(1-B)-T32.$$

14. The method according to claim 2, wherein:

the data-writing phase comprises the first bias adjustment stage, the emission-holding phase comprises the first bias adjustment stage, or each of the data-writing phase and the emission-holding phase comprises the first bias adjustment stage.

15. The method according to claim 1, wherein:

each display frame of the display panel comprises a data-writing phase and an emission-holding phase;

during each display frame of the display panel, a quantity of pulses of an ineffective level of the emitting control signal is equal to an integer greater than one and is equal to a quantity of pulses of the effective level of the emitting control signal;

a first pulse of the pulses of an ineffective level of the emitting control signal is in the data-writing phase, and the first switch circuit is activated during the first pulse to transmit the first voltage signal, which is equal to $V_{DVH3}$, to a gate of the drive transistor;

a second pulse of the pulses of an ineffective level of the emitting control signal is subsequent to the first pulse and is in the emission-holding phase, and the first switch circuit is activated during the second pulse to transmit the first voltage signal to the gate of the drive transistor; and $V_{DVH3}$ is neither equal to $V_{DVH1}$ nor equal to $V_{DVH2}$.

16. A display apparatus, comprising a display panel, wherein:

the display panel comprises a plurality of pixel circuits, each pixel circuit of the plurality of pixel circuits comprises an emitting control circuit, a drive transistor, a first switch circuit;

the emitting control circuit is electrically connected to the drive transistor, and a control terminal of the emitting control circuit is configured to receive an emitting control signal;

a control terminal of the first switch circuit is configured to receive a first control signal, a first terminal of the first switch circuit is configured to receive a first voltage signal, and a second terminal of the first switch circuit is electrically connected to a terminal of the drive transistor;

each display frame of the display panel comprises a first bias adjustment stage;

during the first bias adjustment stage, the first control signal is configured to control the first switch circuit to transmit the first voltage signal to the terminal of the drive transistor;

a duty ratio of an effective level of the emitting control signal in a first display frame of the display panel is different from the duty ratio of the effective level of the emitting control signal in a second display frame of the display panel; and the first voltage signal is equal to $V_{DVH1}$ in the first bias adjustment stage of the first display frame and is equal to $V_{DVH2}$ in the first bias adjustment stage of the second display frame, and $V_{DVH1}$ is not equal to $V_{DVH2}$.

* * * * *